(12) United States Patent
Congiu et al.

(10) Patent No.: US 9,385,599 B2
(45) Date of Patent: Jul. 5, 2016

(54) CONVERTER CIRCUIT AND METHOD FOR CONVERTING AN INPUT VOLTAGE TO AN OUTPUT VOLTAGE USING A WHITE NOISE GENERATOR

(71) Applicant: Infineon Technologies Austria AG, Villach (AT)

(72) Inventors: Andrea Congiu, Cagliari (IT); Emanuele Bodano, Villach (AT); Dirk Hammerschmidt, Villach (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 34 days.

(21) Appl. No.: 14/261,446

(22) Filed: Apr. 25, 2014

(65) Prior Publication Data

US 2014/0320100 A1    Oct. 30, 2014

Related U.S. Application Data

(60) Provisional application No. 61/815,787, filed on Apr. 25, 2013.

(51) Int. Cl.
*H02M 3/157*    (2006.01)

(52) U.S. Cl.
CPC ................................ *H02M 3/157* (2013.01)

(58) Field of Classification Search
CPC ...... H02M 1/44; H02M 3/157; H02M 3/1563
See application file for complete search history.

(56) References Cited

U.S. PATENT DOCUMENTS

| | | | |
|---|---|---|---|
| 5,640,315 A * | 6/1997 | Hirano et al. | 363/41 |
| 5,691,720 A * | 11/1997 | Wang et al. | 341/143 |
| 8,604,766 B2 * | 12/2013 | Shiraishi et al. | 323/283 |
| 2006/0197561 A1 * | 9/2006 | Lee et al. | 327/131 |
| 2006/0276915 A1 | 12/2006 | Kelly | |
| 2009/0027020 A1 * | 1/2009 | Qiu et al. | 323/282 |
| 2012/0025880 A1 * | 2/2012 | Romano et al. | 327/156 |
| 2012/0223692 A1 * | 9/2012 | Prodic et al. | 323/283 |

OTHER PUBLICATIONS

Shirazi et al., "Integration of Frequency Response Measurement Capabilities in Digital Controllers for DC-DC Converters", IEEE Transactions on Power Electronics, Sep. 2008, pp. 2524-2535, vol. 23, No. 5.

Johansson et al., "Possibilities of Obtaining Small-Signal Models of DC-to-DC Power Converters by Means of System Identification", 2000, pp. 65-75, Sweden.

Walter Stefanutti et al. "Autotuning of Digitally Controlled DC-DC Converters Based on Relay Feedback", pp. 1-6, 2007.

Zhenyu Zhao et al. "Limit-Cycle Based Auto-Tuning System for Digitally Controlled Low-Power SMPS", pp. 1143-1147, 2006 IEEE.

Botao Miao et al. "System Identification of Power Converters With Digital Control Through Cross-Correlation Methods", IEEE Transactions on Power Electronics, pp. 1093-1099, vol. 20, No. 5, Sep. 2005.

Anekal B. Sripad et al. "A Necessary and Sufficient Condition for Quantization Errors to be Uniform and White", IEEE Transactions on Acoustics, Speech, and Signal Processing, pp. 442-448, vol. ASSP-25, No. 5, Oct. 1977.

* cited by examiner

*Primary Examiner* — Harry Behm
*Assistant Examiner* — Peter Novak

(57) ABSTRACT

A converter circuit is described comprising a switch circuit configured to provide an output voltage, a control circuit comprising an analog control portion and a digital control portion and a noise generator configured to generate white noise, wherein the noise generator is configured to supply the generated white noise to the digital control portion of the control circuit and wherein the control circuit is configured to control the switch circuit based on the white noise.

28 Claims, 16 Drawing Sheets

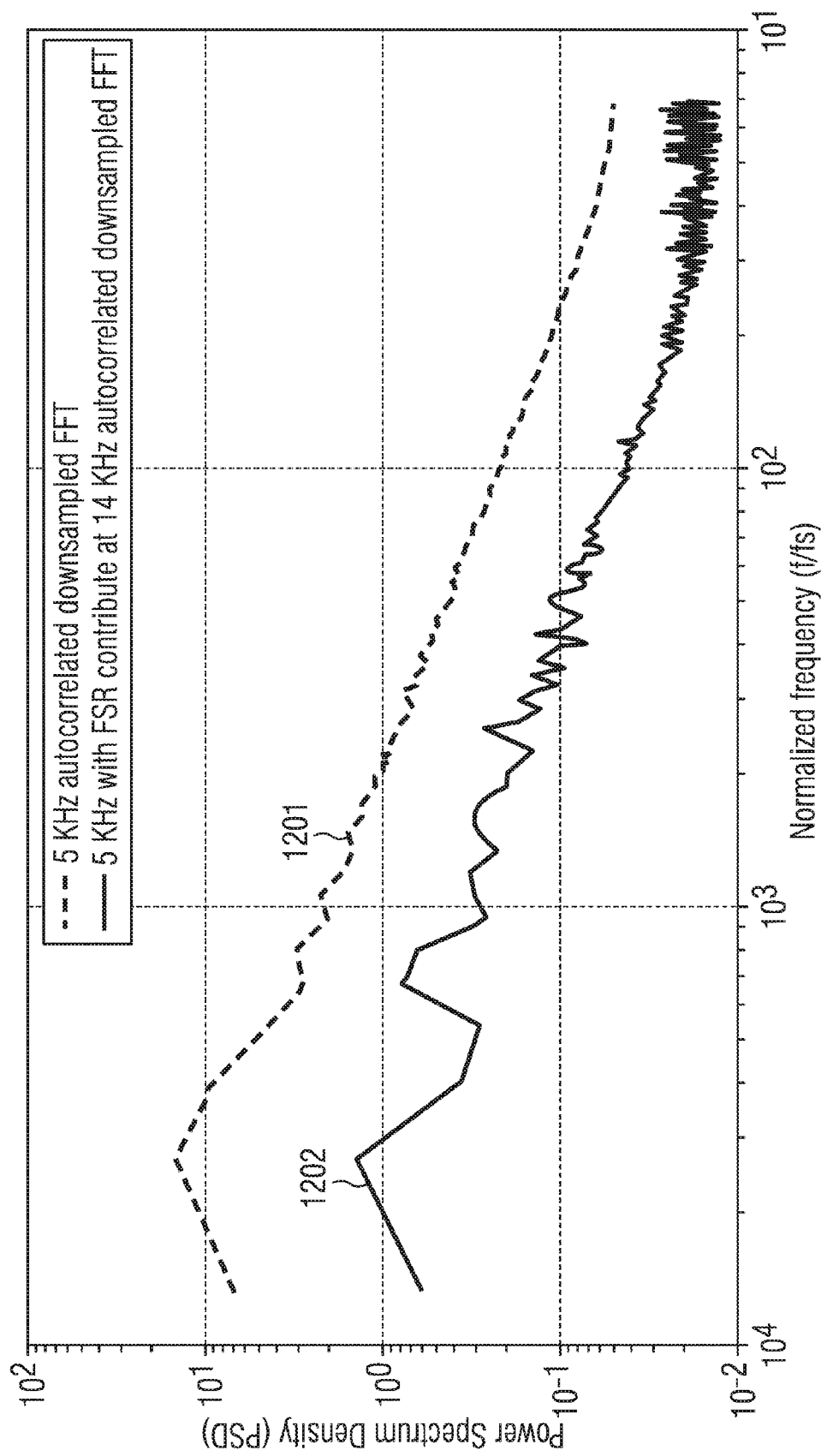

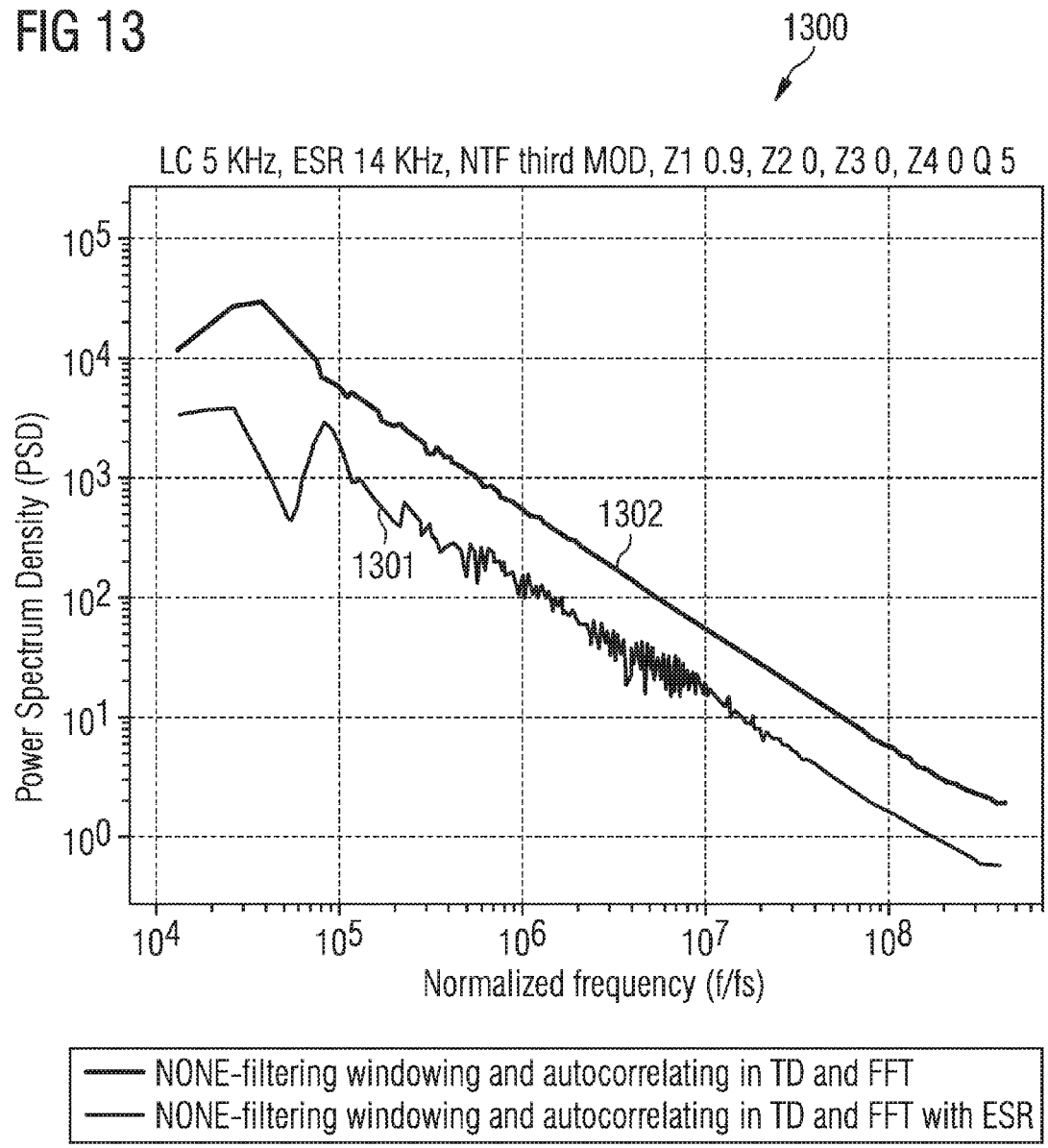

CONVERTER CIRCUIT AND METHOD FOR CONVERTING AN INPUT VOLTAGE TO AN OUTPUT VOLTAGE USING A WHITE NOISE GENERATOR

CROSS-REFERENCE TO RELATED APPLICATION

This application claims the benefit of U.S. provisional application No. 61/815,787, filed 25 Apr. 2013, the content of it being hereby incorporated by reference in its entirety for all purposes.

TECHNICAL FIELD

Various embodiments relate generally to converter circuits and methods for converting an input voltage to an output voltage.

BACKGROUND

System power supplies such as switched-mode power supplies (SPMS) may be implemented as feedback loops that regulate voltage and/or current to an external load. Control loops are typically designed conservatively, i.e. to achieve a high level of stability. For example, closed loop regulation and stability margins are maintained agreeing with expected ranges of operating conditions and tolerances in load power stage parameters (e.g. of inductors and/or capacitors of a power stage of an SPMS).

However, non-idealities of components external to an SPMS may lead to closed-loop performance degradation or stability losses when there are significant operating point changes associated with component degradation.

SUMMARY

A converter circuit is described including a switch circuit configured to provide an output voltage, a control circuit including an analogue control portion and a digital control portion and a noise generator configured to generate white noise, wherein the noise generator is configured to supply the generated white noise to the digital control portion of the control circuit and wherein the control circuit is configured to control the switch circuit based on the white noise.

Further, a method for converting an input voltage to an output voltage according to the converter circuit described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 12 shows PSD (power spectrum density) results considering an in-loop $\Delta\Sigma$ source of noise.

FIG. 13 illustrates the result of modifying a third order NTF in order to add an in-band zero close to the resonant frequency.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

According to one embodiment, a converter circuit with a control loop, e.g. a SPMS (switched-mode power supply) is provided which includes a white noise generator which excites the control loop at a broad range of frequencies. From the response of the control loop to the excitation, information about external components, e.g. an output network, may be derived, which may in turn be used for a configuration of the control loop, e.g. an adjustment of controller parameters.

In the following, an example for a converter circuit 100 consistent with the techniques described herein is described with reference to FIG. 1.

Figure 1:
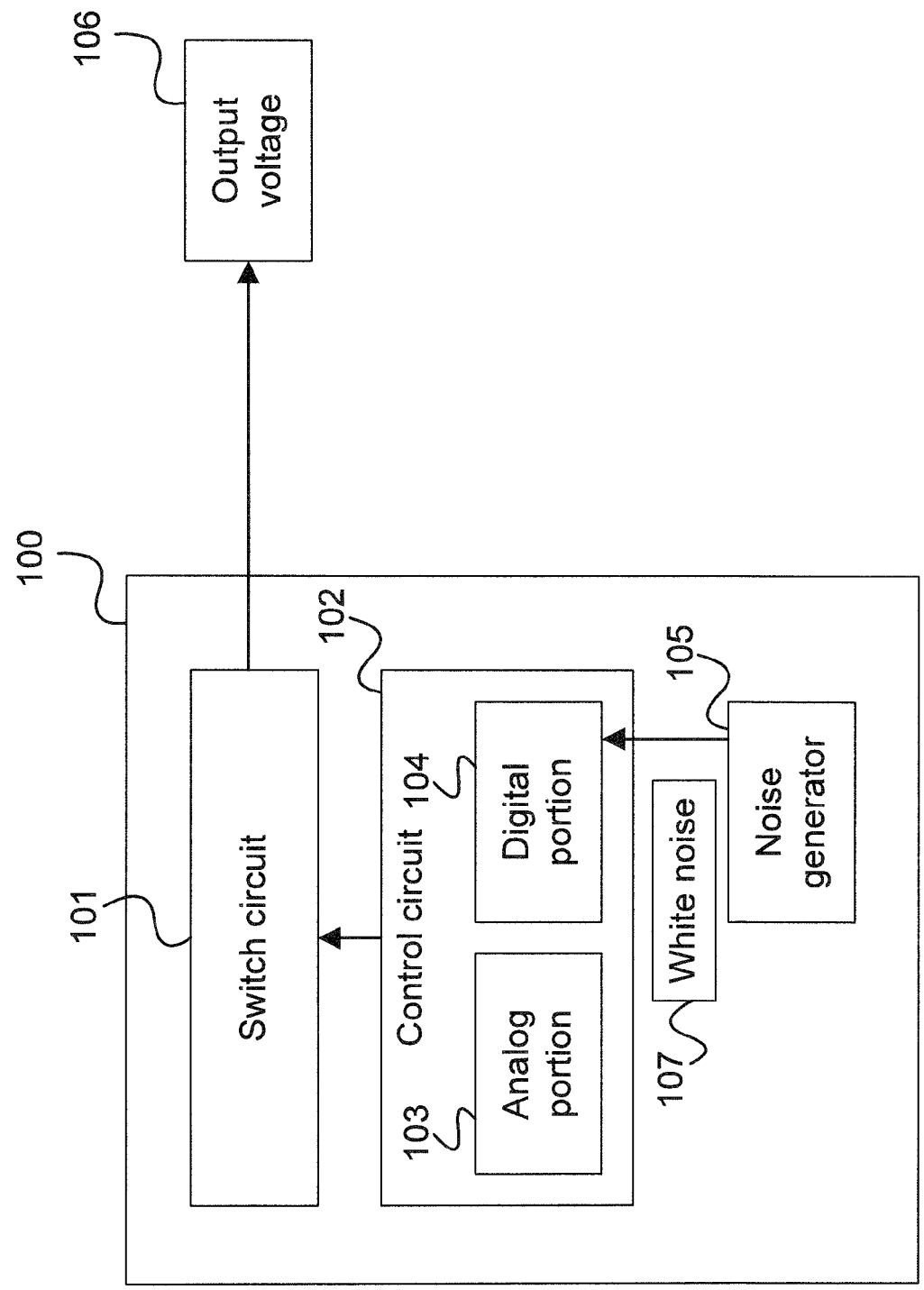
FIG. 1 shows a converter circuit according to an embodiment.

FIG. 1 shows a converter circuit 100 according to an embodiment.

The converter circuit 100 includes a switch circuit 101 configured to provide an output voltage 106 and a control circuit 102 including an analogue control portion 103 and a digital control portion 104.

The converter circuit 100 further includes a noise generator 105 configured to generate white noise 107 wherein the noise generator is configured to supply the generated white noise to the digital control portion 104 of the control circuit 102 and the control 102 circuit is configured to control the switch circuit 101 based on the white noise 107.

The converter circuit is for example configured as a DC to DC converter circuit, for example as a switched mode power supply circuit.

According to various embodiments, in other words, white noise may be introduced into a control loop to excite the system at various frequencies. Based on the results of these excitation, parameters such as the ESR (Equivalent Serial resistor) and the LC resonance frequency of an output network may be extracted.

White noise is for example noise given by a random variable whose distribution is nonzero only over an interval equal to the quantization step. White noise may also be understood as a random signal with a flat (constant) power spectral density.

According to various embodiments, the switch circuit includes at least one switch transistor.

For example, the at least one switch transistor includes at least one switch transistor.

The at least one power switch transistor may for example include at least one of a field effect transistor and an insulated gate bipolar transistor.

According to various embodiments, the control circuit is configured to control the switch circuit based on the white noise in order to determine at least one property of at least one of the load and of the converter circuit. In other words, a property of the load (such as an inductance, a capacity and/or and equivalent serial resistance) may for example be determined based on a reaction of the converter circuit to the white noise, i.e. the behaviour of the converter circuit in reaction to the white noise.

The control circuit may further be configured to determine one or more of a group consisting of:
an inductance of an inductor;
a capacitance of a capacitor;
an equivalent serial resistance of a capacitor; and
an electric property of the load.

According to one embodiment, the control circuit is configured to control the switch circuit to provide the output voltage based on a duty cycle; and the control circuit is configured to control the switch circuit based on the white noise by adding the generated white noise to the duty cycle. In other words, for example, the white noise is added to a pulse width modulation signal based on which the converter circuit generates the output voltage according to pulse width modulation.

The control circuit for example comprises an analog to digital converter configured to receive an indication of the output voltage and to provide a digital value indicative of the received indication of the output voltage.

For example, the analog to digital converter is further configured to compare the received indication of the output voltage to a reference voltage; and generate an error signal that represents a difference between the received indication of the output voltage and the reference voltage. The error signal may for example be a digital value specifying the difference between the received indication of the output voltage and the reference voltage.

The control circuit is for example configured to add the generated white noise to the error signal. In other words, for example, a digital value of a digital white noise signal is added to a digital value representing a difference between the received indication of the output voltage and the reference voltage.

The control circuit may be configured to sequentially increase the reference voltage. For example, the reference voltage may be increased in steps from an initial value (e.g. zero) up to a target value. This may for example be performed at an initial phase (e.g. a start-up phase).

According to one embodiment, the control circuit further comprises a proportional-integral derivative (PID) controller configured to receive the error signal and generate a PID output based on the received error signal.

The control circuit may further be configured to add the generated white noise to the PID output.

According to one embodiment, the control circuit further comprises a pulse width modulation controller configured to receive the PID output and to generate a pulse width modulated control signal configured to control a power stage to provide the output voltage to the load. In other words, for example, a signal specifying a pulse width for a pulse width modulation is determined by the pulse width modulation controller (e.g. a digital pulse width modulation block) and supplied to a power stage which generates the output voltage according to pulse width modulation based on the signal specifying the pulse width.

The control circuit may for example be configured to add the generated white noise to the pulse width modulated control signal.

According to one embodiment, the noise generator is configured to generate the white noise using a sigma delta converter.

According to one embodiment, the noise generator is further configured to decrease a resolution of the sigma delta converter to increase an amplitude of the generated white noise. The resolution of the sigma delta converter may for example be the resolution of an output quantizer of the sigma delta converter.

The sigma delta converter may include more than one feedback loop. For example, at least one zero of the sigma delta converter is arranged closely to the load resonance frequency According to one embodiment, the control circuit further comprises an analog to digital converter (A/D) configured to receive an indication of an output voltage at the load; compare the received indication of the output voltage to a reference voltage; and generate an error signal that represents a difference between the received indication of the output voltage and the reference voltage; and the control circuit is configured to process the error signal to determine one or more of the cut frequency of the control circuit and an equivalent series resistance of a capacitor.

The control circuit may further be configured to process the error signal to determine a Spectral Power Density.

According to one embodiment, the control circuit is further configured to determine one or more of a loop cut frequency of the control circuit and an equivalent series resistance of a capacitor based on the determined Spectral Power Density.

According to one embodiment, the control circuit is further configured to adapt at least one coefficient of a proportional-integral derivative (PID) controller configured to receive the error signal and generate a PID output based one or more of the determined loop cut frequency of the control circuit and the determined equivalent series resistance of a capacitor. In other words, based on the result of the determination, the control circuit may adapt one or more parameters of the PID controller.

Figure 2:
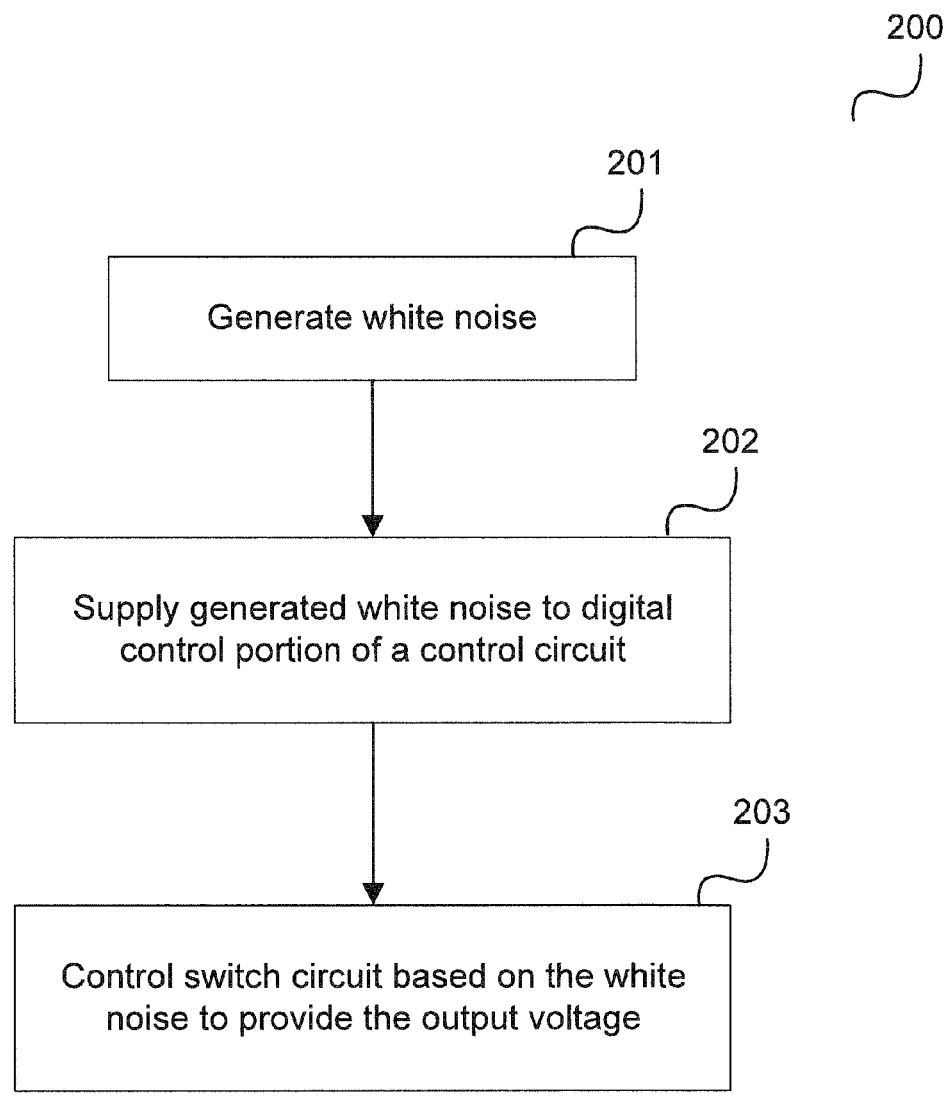
FIG. 2 shows a flow diagram illustrating a method for converting an input voltage to an output voltage.

The converter circuit 100 for example carries out a method as illustrated in FIG. 2.

FIG. 2 shows a flow diagram 200.

The flow diagram 200 illustrates a method for converting an input voltage to an output voltage.

In 201 white noise is generated.

In 202, the generated white noise is supplied to a digital control portion of a control circuit.

In 203, the control circuit controls a switch circuit based on the white noise to provide the output voltage.

It should be noted that embodiments described in context of the converter circuit 100 are analogously valid for the method illustrated in FIG. 2 and vice versa.

In the following, embodiments will be described in greater detail. It should be noted that the various concepts described in the following may be used together or separately.

Figure 3:
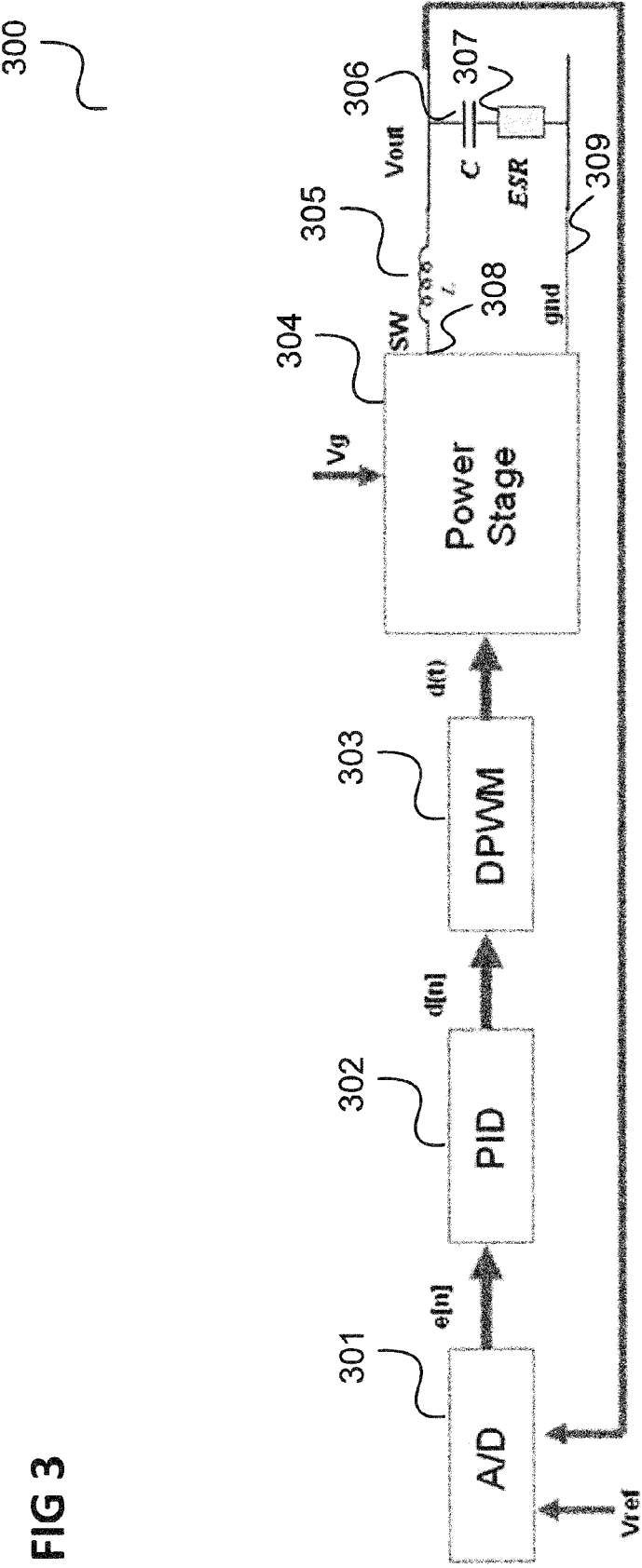
FIG. 3 is a block diagram that depicts one example of a switched-mode power supply (SPMS).

FIG. 3 shows a switched-mode power supply (SPMS) 300.

The SPMS 300 may be a step-down SMPS working in a digital control loop. It may include an analogue to digital (A/D) converter 301 which receives a voltage reference Vref and the output voltage Vout. The SPMS 300 is configured to reach an output voltage Vout as close as possible to the reference voltage Vref. The A/D converter 301 generates an error signal e[n], which is the digitized difference between the voltage reference Vref and the output voltage Vout. The error signal e[n] is then filtered via a PID (Proportion Integral Derivative) block 302. The parameters of the PID block are for example set to achieve a certain stability and a certain dynamic performance of the SPMS 300. The PID block 302 generates a digital representation of the duty cycle d[n] reached by the control loop which is fed to a digital PWM (pulse width modulation) block 303 (DPWM block). The DPWM 303 is a digital PWM with finite resolution (e.g. lower than the resolution of the PID block 302 and the digital representation of the duty cycle d[n] generated by the PID block 302). It modulates, based on a digital counter, the duty cycle d(t) of a square wave according to a time taken by the digital counter to reach d[n]. The duty cycle d(t) is fed to a power stage block 304. The power state block 304 connects an SW node 308 by means of a low ohmic path (i.e. realized by switchers) to a supply potential Vg when d(t) is high level and to ground (gnd) when d(t) is low level.

An output network includes an inductor 305 arranged serially behind the SW node 308 and a capacitor 306 and an ESR 307 which are connected in series between a ground node 309 and the voltage output node 310 (which is formed by the terminal of the inductor not connected to the SW node 308).

According to various embodiments, white noise v(n) may be added which excites all frequencies of the output stage (i.e. the stage including the power stage 304 and the output network, i.e. the stage formed by the inductor 305, the capacitor 306 and the ESR 307). This is illustrated in FIG. 4.

Figure 4:
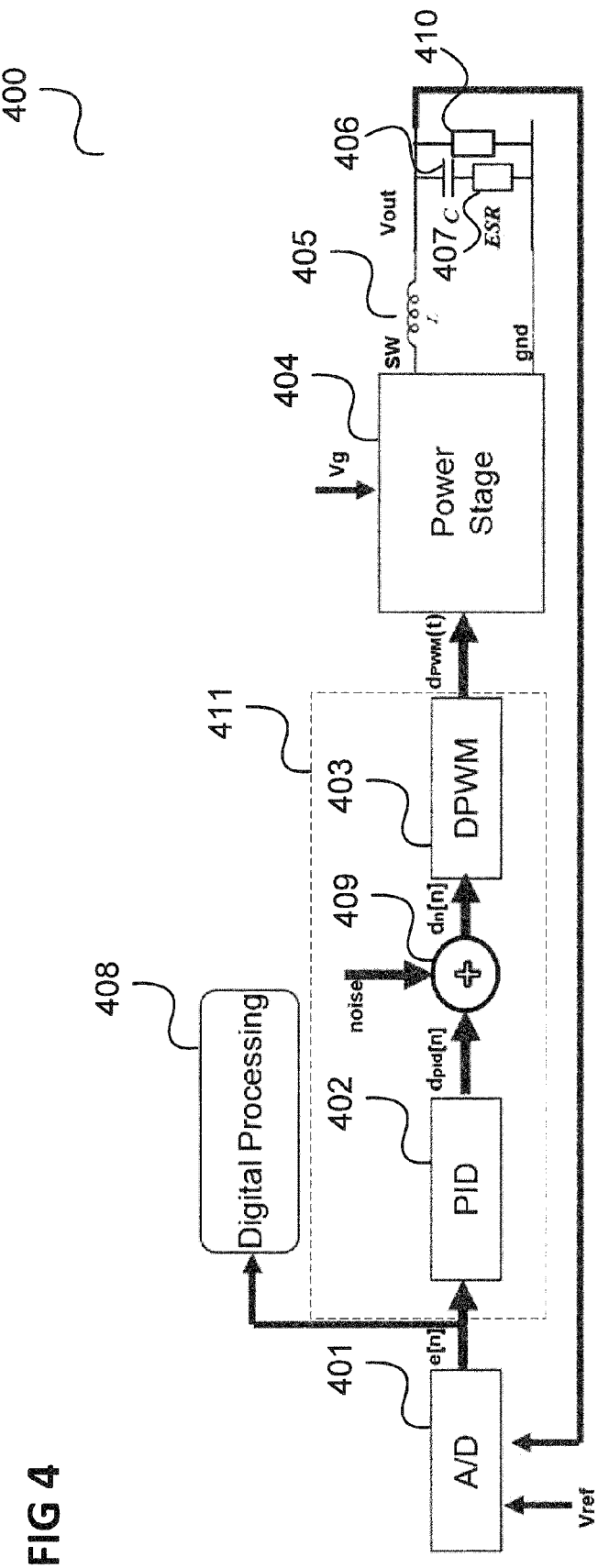
FIG. 4 is a block diagram that depicts another example of an SPMS according to an embodiment.

FIG. 4 shows an SPMS 400.

Similarly to the SPMS 300, the SPMS 400 includes an A/D converter 401, a PID block 402, a DPWM block 403, a power stage 404 and an output network (output filter) including an inductor 405, a capacitor 406 and an ESR 407 which may be arranged and configured as explained with reference to FIG. 3. In addition, the SPMS 400 includes a digital processing block 408 which receives the error signal e[n] and an addition circuit 409 which is arranged between the PID block 402 which adds white noise to the output of the PID block 402. A result of this addition, i.e. an output of the addition circuit 401, is supplied to the DPWM block 403. Further, a load resistor 410 is assumed in this example connected between the voltage output node and the ground node, i.e. in parallel to the capacitor 406 and the ESR 407.

The addition of the white noise may for example be done in various ways. The usage of a second or higher order delta-sigma ($\Delta\Sigma$) modulator in an error-feedback configuration is illustrated in FIG. 5.

Figure 5:
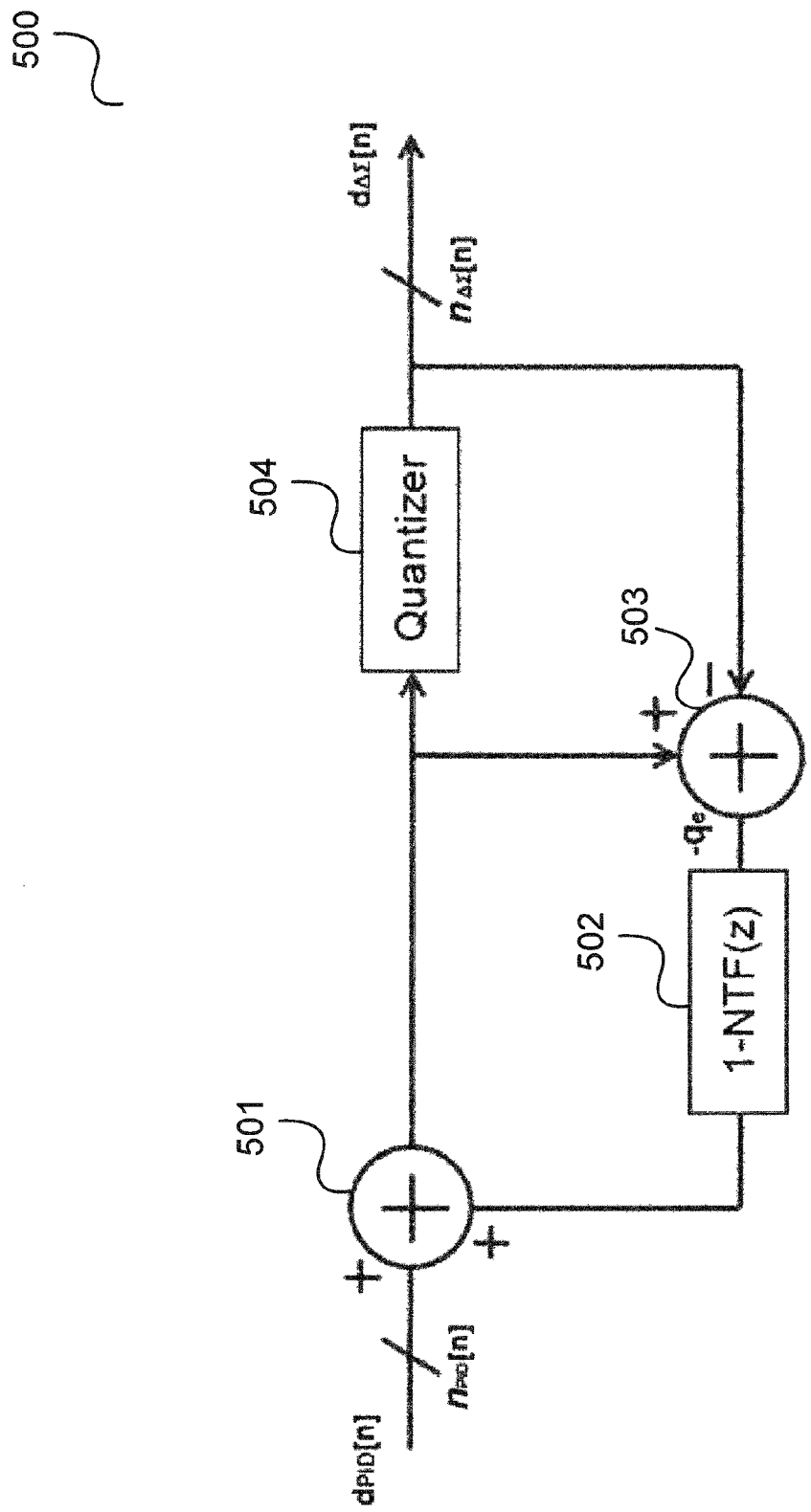
FIG. 5 shows one example of an addition circuit according to an embodiment.

FIG. 5 shows an addition circuit 500 according to an embodiment.

The addition circuit 500 for example corresponds to the addition circuit 409.

The input signal of the addition circuit 500 is the digital duty cycle d[n] as output by the PID block 402. An adder 501 adds to this the output of an 1-NTF block 502. The 1-NTF block 502 is for example an HP (high pass) filter used for the noise shaping.

Its input is the difference (generated by a subtractor 503) between the output of the adder 501 and the output of the addition circuit 500. The output of the addition circuit 500 is the output of the adder 501 quantized by a quantizer 504. The error signal qe (specifying the difference between the output of the adder 501 and the output signal of the addition circuit 500) has the characteristics of white noise.

Figure 6:
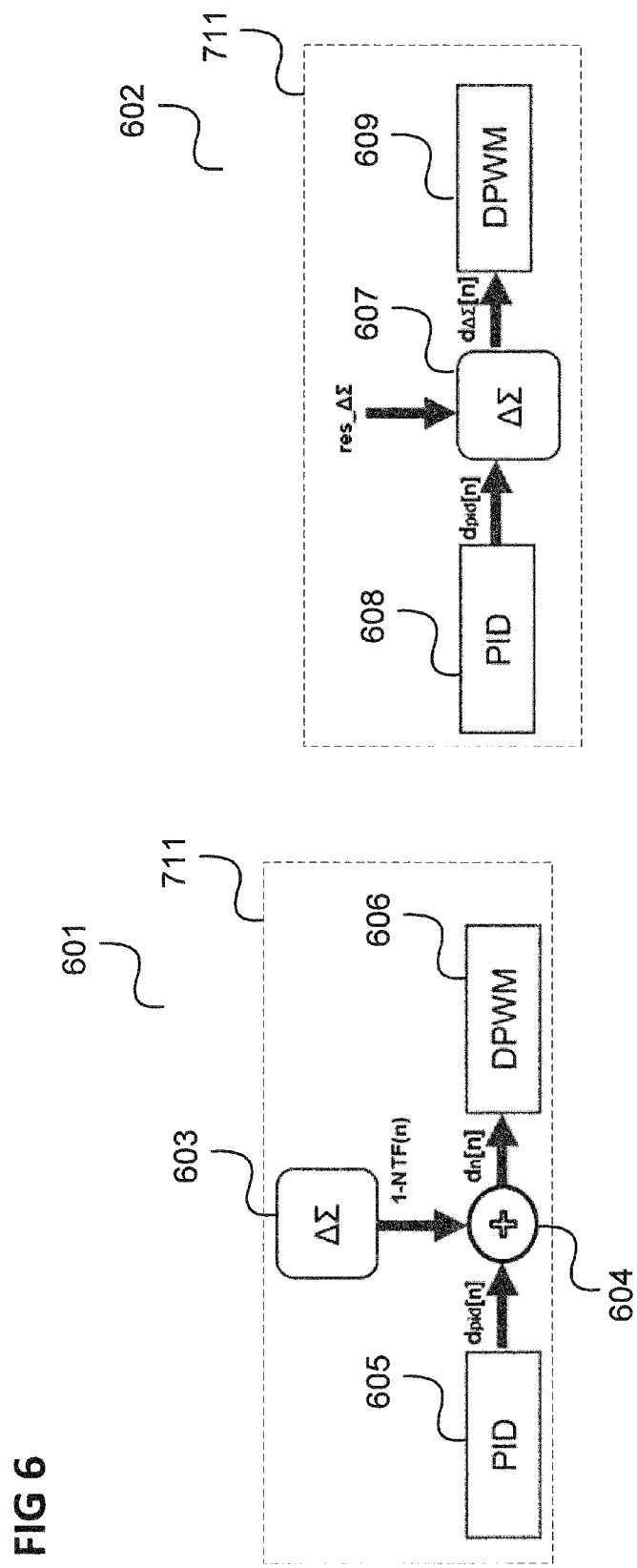
FIG. 6 illustrates depicts various examples of arrangements for adding white noise.

FIG. 6 illustrates arrangements 601, 602 for adding white noise.

The first arrangement 601 may for example be used as the part of the SPMS 400 indicated by the dashed box 411.

Similarly, the second arrangement 602 may for example be used as the part of the SPMS 400 indicated by the dashed box 411.

In the first arrangement, a $\Delta\Sigma$ block 603, which may be seen to be arranged out of the control loop of the SPMS 400, supplies its output (i.e. white noise) to an addition circuit 604 corresponding to addition circuit 409 which is arranged between a PID block 605 corresponding to PID block 402 and an DPWM block 606 corresponding to DPWM block 403.

In the second arrangement 602, a $\Delta\Sigma$ block 607, which may be seen to be arranged in the control loop chain between a PID block 608 corresponding to PID block 402 and an DPWM block 608 corresponding to DPWM block 403, is provided in place of the addition circuit 409. In this case, the $\Delta\Sigma$ block 607 be also be used in order to increase the effective average resolution of the DPWM block 403.

According to various embodiments, a low quantity of noise is added, e.g. by the addition circuit 409, in order to stimulate a loop reaction. The loop reaction may mainly contain information about a load of the SPMS 400, e.g. including the load resistor 710. In case of an in-loop delta-sigma in error-feedback configuration (e.g. as in the second arrangement 602), the adding (injection) of noise does not add delays to the signal path. In this case the noise may be injected such that it is sufficient to stimulate the load without bringing the system in instability. Steady-state time analysis shows that it may be achieved that the Vout results close to Vref despite the noise injection. By processing the ADC 401 output load parameters may be determined.

In the out-loop $\Delta\Sigma$ implementation (e.g. as in the first arrangement 601) the steady state condition of the SPMS 400 may be described considering the added noise:

$$V\text{out}=1/N*d_{DPWM}$$

where N is the relationship between the switching period (which for example drives a power MOS transistor) and a DPWM clock period Tsw=N*Tclk.

Considering the in-loop delta sigma implementation (as in the second arrangement 602) the added noise may be amplified lowering the resolution of a quantizer of the ΔΣ block with respect to the DPWM resolution. The resolution of the quantizer of the ΔΣ block may be set via a parameter res_ΔΣ. In this case, one may write:

$$V\text{out}=d_{DWPWM}*V\text{in}=1/N*(d_{pid}[n]+\text{noise})*V_{in}$$

Here, the parameter "noise" can be 1-NTF[n]. It should be noted that the variance of the signal e[n] and/or dpid[n] may be much higher than the variance of the quantizer of the ΔΣ block. The PID signal (i.e. the output signal of the PID block 402) is for example quantized with a quantizer of the ΔΣ which has a lower resolution than the PID signal. The least significant bit of the ΔΣ block is quantization noise. White noise is for example noise given by a random variable whose distribution is nonzero only over an interval equal to the quantization step. White noise may also be understood as a random signal with a flat (constant) power spectral density.

Both DPWM 403 and the quantizer of the ΔΣ block 603, 607 may have the same full scale range VFS. The resolution of the ΔΣ quantizer can be $2^a$ time lower than the DPWM one. In this case, the noise expression can be extracted as a function of the difference of resolution:

$$\text{noise}=|\text{LSB}_{\Delta\Sigma}-\text{LSB}_{DPWM}|=|V_{FS}/2^{N-a}-V_{FS}/2^N|=|V_{FS}*(2^{a-N}-2^{-N})|$$

Considering that the DPWM may work mainly as a one step counter from 1 to 2^N, noise expression may be simplified considering VFS=2^N, then:

$$\text{noise}=|2^a-1|$$

In the approach illustrated by the first arrangement 601 the noise term is simply a white noise resulting from the (output) quantizer of the ΔΣ block 603 modelled as in FIG. 5. Providing a ΔΣ block out of the loop (as in the first arrangement 601) as source of noise permits to dimension the noise amplitude as wanted and set it according to the loop parameters and according to the DPWM resolution in order that system stability is respected. This may have benefits since the noise added may be, as in the embodiments described above, a real white noise and not an emulation of it. A PRBS sequence typically has resolution issues. Quantization noise typically results very close to the ideal white noise. As shown in FIG. 5 the hardware needed to realize a ΔΣ block in an error-feedback configuration may be kept small in chip area and the same circuit may be used during compensation phases in order to improve resolution of the system during steady state.

The approach illustrated by the second arrangement 602 uses the ΔΣ in the in loop configuration. In this case, the noise could be added considering a lower resolution of the quantizer (see FIG. 5) with respect to $d_{PID}[n]$ and optionally to the DPWM resolution. The term $2^a$ gives the difference between the $d_{PID}[n]$ resolution and the quantizer resolution which is part of the ΔΣ block 607.

Expanding the output of the ΔΣ block 607 in the output voltage could be expressed as:

$$V\text{out} = \frac{1}{N} * (d_{PID}[n] - NTF(z)*(q_e) + \text{noise}) * V\text{in} =$$
$$= \frac{1}{N} * (d_{PID}[n] - NTF(z)*(d_{PID}[n-1] - d_{\Delta\Sigma}[n-1]) \pm |2^a - 1|) * V\text{in}$$

During loop compensation phase the noise term $(|2^a-1|)$ is zero because DPWM and ΔΣ block have the same resolution in this embodiment. In this condition the averaged resolution of the output voltage may be improved by the ΔΣ block with a process composed by dithering, oversampling and filtering. The filtering may be done by the output filter which composes a Buck converter power output. The dithering may be considered as the noise injection; during an identification process this component may be incremented lowering the ΔΣ resolution with respect to the resolution of the DPWM.

For instance, if noise should be inserted but the amplitude of the output voltage should be limited during the steady state condition a controlling/processing circuit (e.g. the state machine 910 or the processing block 908 as described below with reference to FIG. 9) may set the parameter a to "1", which gives $$V\text{out}=1/N*(d_{PID}[n]-NTF(z)*(d_{PID}[n-1]-d_{\Delta\Sigma}[n-1])\pm 1)*V\text{in}$$

The approach with in-loop ΔΣ block permits also to manipulate the amount of noise considering different NTF(z) configurations. A noise shaper filter of the ΔΣ block (e.g. corresponding to 1-NTF block 502) may be of different orders (starting from the second) but also could have one or more in band zeros. In band zero may be used in order to focus the noise injection. To focus the noise injection helps during parameters identification, especially during ESR extraction. The noise shaper filter for example has a polynomial expression which defines the order of the ΔΣ block. For instance a NTF of the $3^{rd}$ order may be considered which may add one or two in-band zeros. A $3^{rd}$ order noise shaper filter with one in-band zero may for example be as follows:

$$NTF(z)=(1-z^{-1})*(1-K_1z^{-1}+z^{-2})$$

Considering $f_{SW}$ the switching frequency, $f_o$ the output resonant frequency, K1 is given by $$K_1=2*\cos(2\pi*A*f_0/f_{SW})$$

Illustratively, a two-step approach may be used: First, f0 is determined (e.g. by a controlling/processing circuit) and then the ESR and the determined ESR is compensated for in the control loop (e.g. by the controlling/processing circuit).

If $K_1=1$ the NTF becomes a normal third order NTF without in-band zeros. In the above formula of K1 expression A represents a scaling factor which permits to set the in-band zero position respect to the resonant frequency. Fixing the order Nth of the ΔΣ the number of in-band zeroes could go from 0 to Nth/2 if the order is even or until Nth-½ if the order is odd. For instance a $5^{th}$ order NTF could have 0 or 1 or 2 in band zeros and a $6^{th}$ order NTF could have 0 or 1 or 2 or 3 in band zeroes. When zero/s is used for ESR identification they may be distributed in frequency.

For instance in case of three in band zeros one may be put over the resonant frequency in order to limit the noise injection at this frequency then trying to excite a specified range of frequencies in which more resolution is desired. This may happen especially when looking for ESR contribution.

Parameters extraction may be done by the digital signal processing block 408 in FIG. 4. After recording the ADC output error e[n] the digital signal processing block 408 may perform processing algorithms on the time record of the output error e[n] including windowing, filtering and/or averaging, correlation (in order to low the noise contribute), FFT and Power Spectrum Density (PSD). Any other controlling/processing circuit may perform this processing instead of the digital signal processing block 408.

The digital signal processing block 408 may downsample and/or window in time domain the recorded (time record) vector e[n] before any processing algorithms.

For example, processing algorithms used by the digital signal processing block 408 in time domain may include:

Downsampling. Taking a sample every N the maximum considered frequency is reduced by a factor of 1/N.

Windowing. For instance a Blackman windows w(n) may be considered:

$$w(n) = a_0 - a_1 \cos\left(\frac{2\pi n}{N-1}\right) + a_2 \cos\left(\frac{4\pi n}{N-1}\right)$$

$$a_0 = \frac{1-\alpha}{2}; a_1 = \frac{1}{2}; a_2 = \frac{\alpha}{2}$$

The windowed resulting vector is given as:

$$e[n]=e[n]*w^T[n]$$

e[n] may or may not be downsampled.

Windowing in the time domain may be done by the digital signal processing block 408 for analyzing a periodic behaviour of the function in a short duration. Windowing in frequency domain may be used by the digital signal processing block 408 as a band-pass filtering process.

Correlation. A correlation algorithm may be used by the digital signal processing block 408 both for signal cleaning (time and frequency domain vectors) and PSD analysis.

$$E_{xx} = \sum_{n=1}^{\infty} e(n)*e(n+m)$$

The time record e(n) could be before downsampled and/or windowed.

Considering the FFT of the autocorrelated vector the PSD may be obtained:

$$PSD = \sum_{n=0}^{K} E_{xx}(n)*e^{-j2\pi k \frac{n}{N}} \text{ with } K = 0 \ldots N-1$$

The PSD could be also evaluated as product between the error and itself complex conjugated:

$$E(k) = \sum_{n=0}^{K} e(n)*e^{-j2\pi k \frac{n}{N}} \text{ with } K = 0 \ldots N-1$$

$$PSD = E(k)*E^*(K)$$

Before applying the FFT, the digital signal processing block 408 may downsample and/or window and/or autocorrelate the time record. For downsampled and/or normal data records windowing and autocorrelation may be used by the digital signal processing block 408. Each of these cases may be analyzed by the digital signal processing block 408 in frequency domain using FFT. Each vector in frequency domain may be filtered and/or averaged by the digital signal processing block 408.

Processing algorithms used by the digital signal processing block 408 in frequency domain may include:

Filtering. In order to clean a vector (e.g. the vector e[n] or result of a processing of this vector) the digital signal processing block 408 may filter it with a LP (low pass), HP (high pass) or a BP (band pass) filter in the frequency domain. The vector which is filtered may for example be the result of a FFT or a PSD analysis. In both cases averaging may be done by the digital signal processing block 408 before or after the filtering. Before processing the vector it may be downsampled. During ESR identification filtering processing may be exploited setting the cut off frequency in accordance with the already estimated resonant frequency. Vectors which are submitted to averaging are all frequency domain considered data records, which may be averaged by the digital signal processing block 408 before the processing.

HP-filter: For instance a first order High-Pass filter may be used by the digital signal processing block 408 as follows:

$$y(k)=A*[x(k)-x(k-1)+y(k-1)] \text{ with } k=1 \ldots n-1$$

LP-filter: For instance a first order Low-Pass filter may be used by the digital signal processing block 408 as follows:

$$y(k)=A*[(\tau/T_S)*x(k)+y(k-1)] \text{ with } k=1 \ldots n-1$$

BP-filter: Band pass filtering may be done by mixing both HP and LP filter structures. The Ts factor is related to the dowsampling factor. Data are acquired at the switching frequency fsw of the system (e.g. the SPMS 400). If the data record has been downsampled by a factor N, Ts is equal to N/fsw. Otherwise, it is equal to 1/fsw. The factor τ is related to the cut-off frequency chosen for the processing filter, it is equal to 1/(wc) where wc is the cut off frequency. In both considered filters the term A is:

$$A=(\tau/T_S)/(1+\tau/T_S)$$

Averaging. Considering frequency domain data records, an averaging process on a single vector (e.g. e[n] or a processed version of e[n]) or between two or more vectors may be used. For example a vector in frequency domain may be averaged. This may for example be done before filtering.

The approach described above with reference to FIG. 4 addresses the identification by adding noise. The control loop resolution is lowered in order to stimulate the load for many frequencies. The loop reaction contains the load frequency information and processing the time record load parameters may be extracted by signal processing. The system (i.e. the SPMS 400) does not need to be brought into a particular condition dedicated to the identification. In both cases the digital loop may maintain the same configuration like during normal operation. In one embodiment, for example, only the control loop resolution may be changed in order to excite the load, i.e. other components and parameters may be left unchanged.

Further, according to the above approaches the system does not need to be brought close to instability conditions. Further, the PID controller 402 is used also during the identification. During this phase the PID coefficient could be relaxed (e.g. by a controlling/processing circuit). After the parameter identification it may be tuned in order to obtain a desired control condition.

It should be noted that in a non-parametric identification approach like based on the PRBS (non-parametric are considered all approaches which try to extract all the impulse response of the system) resolutions problems typically do not permit to identify the possibly presence of the zero introduced by the ESR.

According to the approaches described above, the ESR may be identified especially working with PSD analysis, processing the error vector e[n] (which could be downsampled and/or windowed) by autocorrelation. The obtained vector typically shows a second peak (the first peak corresponding to resonant frequency).

Averaging and/or filtering time data records in frequency domain help to clean the signal for the parameters extraction. The results of this further processing may be useful during the identification of the ESR. After the resonant frequency the gain of the system may decrease quickly in frequency, so the ESR contribute could be very difficult to extract. In this case a NTF with in-band zeros (which focus the insertion of noise in the interested range of frequency) may be used joined to a numerical filtering and/or averaging, to clean the signal in the frequency domain. The resolution of data processing may be improved from the time domain considering downsampling, windowing and/autocorrelation processing algorithms.

Also directly processing the data record e[n] with an FFT result an high value of ESR could be identified by the digital signal processing block 408. Results resolution could be improved by considering averaging and/or filtering frequency vectors.

Another consideration in terms of ESR extraction is that after the resonant frequency is known the ΔΣ configuration can be adapted by a controlling/processing circuit (e.g. by the digital signal processing block 408) in order to filter out the resonance frequency ωo and to empathize the ESR frequency range. The NTF function of the ΔΣ block can be adapted by a controlling/processing circuit adding one or more zeros around ωo. In this case a two step approach may be used. First, the ΔΣ block without zeros at ωo is used in order to find as already described the ωo. Then, during a second step, the ΔΣ block is modified adding zeroes around at ωo.

Another step that can be added or that can be used instead of the second part in order to find ESR influence is the analysis of the spectral power which increases with bandwidth.

Given a signal x[n] the spectral power is defined as:

$$E(\omega) = X(\omega) \cdot X^*(\omega).$$

That means that calculating by signal processing the spectral power of the e[n] for a given system, it is possible to evaluate and calculate the bandwidth. In case of ESR close to the ωo the bandwidth increases. This can be found in the spectral power and this information can be used to adapt the system compensation coefficient.

Another step that can be added or that can be used by the digital signal processing block 408 in order to find ωo is the following: during the startup of the system the Vout has to reach the final set voltage. If the reference voltage is increased by steps the reaction of the output voltage Vout contains the frequency information of the output filter.

Figure 7:
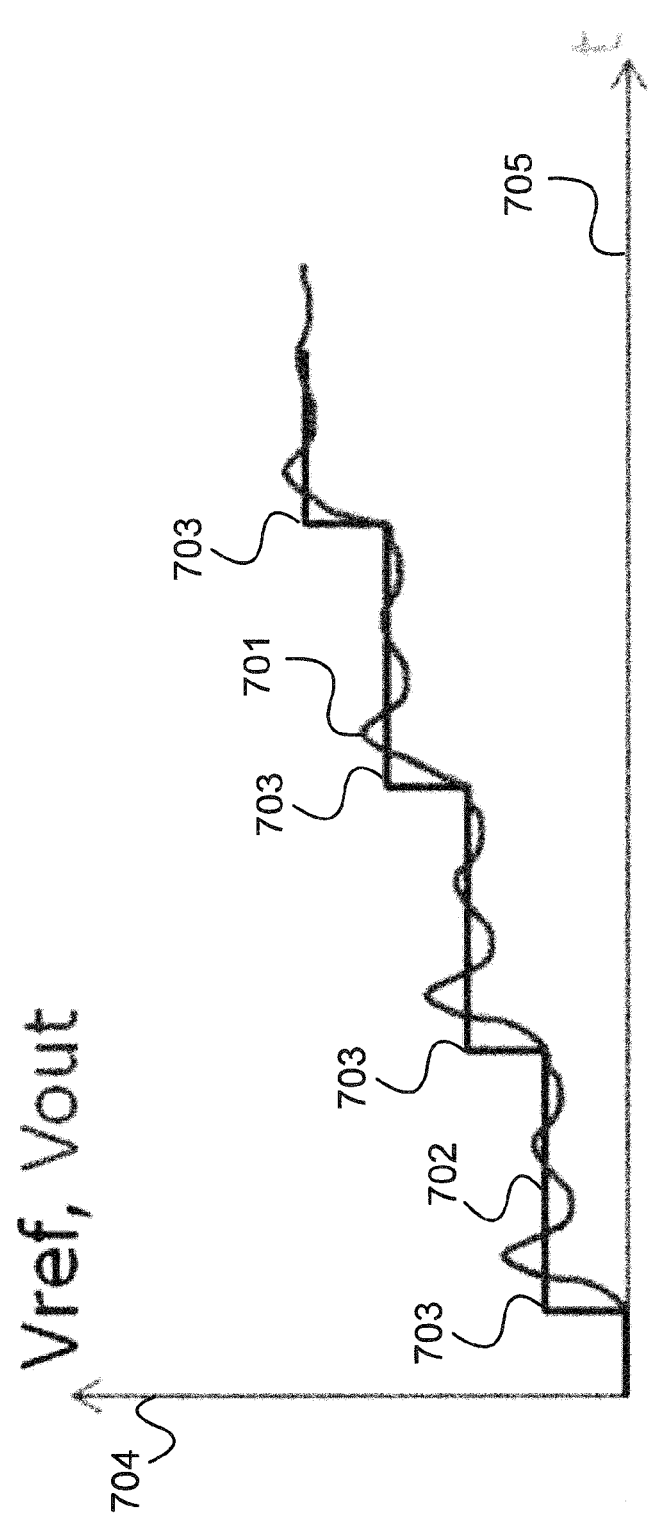
FIG. 7 shows a voltage diagram of the reference voltage over time in an embodiment where the reference voltage is increased in steps.

FIG. 7 shows a voltage diagram 700.

The voltage diagram 700 illustrates the output voltage over time in a first graph 701 when the reference voltage (shown in second graph 702) is increased in a plurality of steps 703. In the voltage diagram 700, voltage increases from bottom to top along a voltage axis 704 and time increases from left to right along a time axis 705.

The output voltage Vout that results in this case can be processed, e.g. by the digital signal processing block 408, (e.g. similarly as described above for the excitation with white noise) and ωo can be identified. In this case the determination may be done based on the step response of the system. The step response is strictly related to the impulse response of the system: By deriving the step response (Y(z)) the pulse response (G(z)) may be obtained:

$$G(z) = ((z-1)/z) \cdot Y(z)$$

For example, this approach is only used during start-up. For example, it can be used by a controlling/processing circuit as a first estimation and eventually the other approaches as described above can be used to find also the ESR and to follow system changes during the system run, (i.e. in case of cold temperature the ESR in some type of capacitor increase of 1-2 orders of magnitude).

According to one embodiment, in summary, one or more of the following are carried out:

1. White noise is injected adding it to the d[n] value.
2. The noise is injected in normal operation and in closed loop without changing the closed loop system frequency behaviour.
3. ΔΣ is used to generate noise according to the first arrangement 601 or the second arrangement 602.
4. According to the second arrangement, the ΔΣ resolution is decreased in order to enhance the noise amplitude.
5. ΔΣ with order >2 is used in order to place the zeroes around ωo and to emphasize frequency around the ESR zero frequency
6. The above (items 1 to 5) is combined and by applying signal processing to the stored e[n] vector the ωo, and/or the ESR zero are extracted and this information is used to adapt the PID coefficient.
7. The above (items 1 to 5) is combined and by applying signal processing to the stored e[n] vector the Spectral Power Density is calculated and the loop cut frequency and the ESR zero effect are estimated.
8. At the start up, the reference voltage is increased by steps and the e[n] step response is analyzed.
9. Item 8 is combined with all or a part of items 1 to 4.

According to various embodiments, approaches are used which may be mainly seen as including a kind of parametric identification process because they are focused on the extraction of load characteristic such as resonant frequency, ESR and bandwidth. Injecting a little amount of noise the system results are far from instability and load frequencies are more stimulated. The output filter response could be extracted from the error which is manipulated by the digital control loop: the added noise could be considered close to an ideal white noise.

The DPWM could be considered as a truncation function. In absence of an ΔΣ block this noise may be added inside the control loop. This kind of noise may be related to the LSB truncation. It may be very close to the resonant frequency causing a ring oscillation which is usually the bigger in amplitude the closer its frequency results to be to the resonant frequency. In a digital-loop the ΔΣ block (with the same resolution of the DPWM) typically simply oversamples this error because the ring oscillation frequency is necessarily lower than the frequency with which the error is processed (which is the switching frequency). This process typically causes that the LSB (least significant bit) truncation in average is not always the same. Thus, the ring oscillation has a different frequency component.

When a source of noise is inserted the LSB truncation becomes random stimulating a big range of load frequencies which are visible in the ADC output of the ADC converter 401. Per definition the white noise contains all frequencies so it is able to stimulate the load. The ADC output is simply a digital conversion of the output filter scaled by the reference voltage Vref:

$$e[n] = V\text{out}[n] - V\text{ref}[n] \rightarrow \text{time data record}$$

The amount of injected noise may be chosen such that it is not too big to bring the system in particular conditions far from the normal behaviour and close to the loop-instability condition. The loop configuration and the main behaviour remains similar to a normal regulation run. The added noise increases the output noise.

The approaches described above do not break the loop adding any delay on the signal path. The same hardware may be used which could be exploited in order to improve the average resolution during steady-state working.

In the digital loop which may be used according to one embodiment as described with reference to FIG. 6 the added noise is represented as a summing node. This source of noise node is a ΔΣ block (wherein the two configurations of the first arrangement 601 and the second arrangement 602 are possible) which could be also exploited after the identification process in order to improve the loop time resolution.

Working with an in-loop ΔΣ model (as illustrated by the second arrangement 602) the same loop may be used both during identification and well-tuned regulation. In order to use the in-loop ΔΣ as source of noise the resolution may be adapted: The resolution of the ΔΣ quantizer may be reduced compared to the one of the DPWM. This further LSB truncation allows exciting the range of stimulated frequencies.

Embodiments may be seen to be also focused on the identification of non-idealities which could impact on the stability of the system. The main non-ideality phenomenon is represented by the Effective Series Resistance (ESR) which adds a zero in the closed-loop transfer function. The issue of a further zero is related to its position: the frequency behaviour of the system could change strongly if it results to be close or even inside the system bandwidth. The ESR may be simply extracted by the PSD (often in the PSD there are two peaks, the bigger around the resonant frequency and the second one related to the introduced zero).

In a two step approach, the noise injection may be focused on the frequencies first before and second after the resonant frequency. The injected noise can be managed by manipulating the NTF: the Noise Transfer Function (NTF) can simply be a high pass filtering of the noise (noise shaping) so this may be done based on both the order and the structure of the NTF. Based on the NTF order means based on the compromise between the amount of noise injected at low and at medium high frequencies. Based on the NTF structure means that it is possible to add some in-band zeros in order to avoid the injection of the noise at particular frequencies (increasing the number of zeros the order of the NTF increasing too).

In PSD analysis there is a peak related to the resonant frequency. If for instance a third order NTF is modified adding a zero very close to the resonant frequencies it can excite the relative peak due to the ESR zero effect. A two steps approach may be used because the second zero position is related to the resonant frequency which usually has the main contribution and it can hide the ESR contribution.

Parameter extraction may be done by signal processing algorithms of the recorded ADC error output which is simply a digitized expression of the scaled output voltage Vout. According to various embodiments, the signal processing process is mainly related to PSD analysis. Before the FFT, an autocorrelation of the time record may be performed. The autocorrelated time record could be before down-sampled and/or windowed in order to reduce high frequency content and reduce the signal processing hardware. In order to have less noisy results after the FFT it is possible to clean the resulting signal of the FFT by averaging and/or filtering. The parameter extraction may be easy and may simply consist of searching the absolute and/or relative maximums on the processed data: usually considering PSD and/or FFT (which could be averaged and or filtered in frequency domain, windowed and/or downsampled in time domain) the resonant frequency may be extracted as the absolute maximum, and if present, the ESR frequency position as second peak.

After the parameters extraction the PID parameters may be adjusted in order to obtain a well controlled system which fits with closed-loop constraints (bandwidth and phase margin).

Approaches based on noise injection could be combined with a start-up identification method. The voltage reference (Vref) is intended as the voltage level needed at the output of the SPMS. If a voltage reference with a step evolution is considered the digitized system step response may be recorded by recording the ADC converter output. The step response is mathematically linked to the pulse response of the system. Processing the ADC converter output, as described above, the resonant frequency may be determined (maximum of the FFT and/or PSD) and eventually the ESR (as a second peak). Also this approach does not modify the digital control loop and it could be considered working during a normal run: a step evolving Vref is a realistic behaviour during the system soft start-up.

Figure 8:
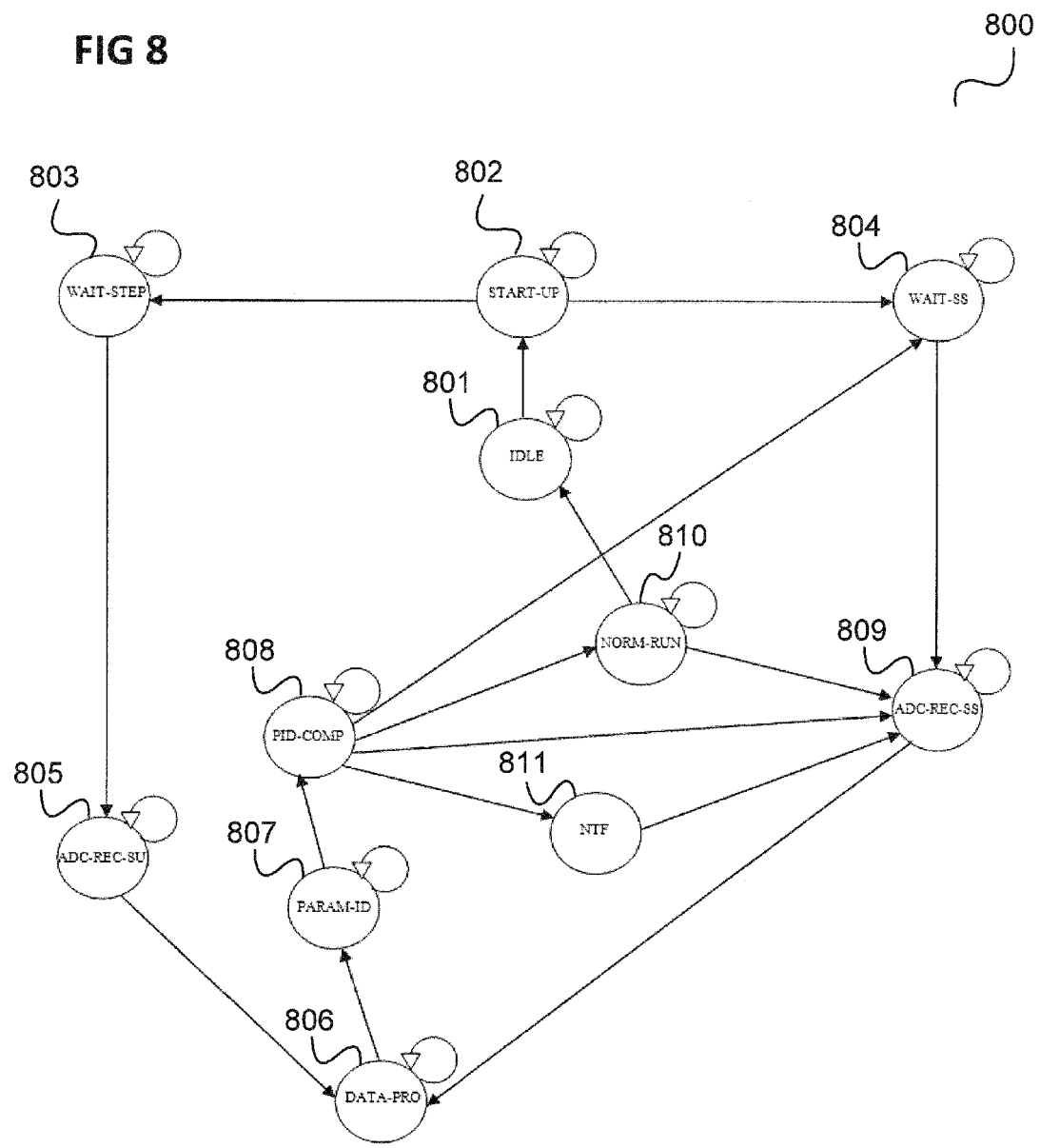
FIG. 8 shows a state diagram for an SPMS according to an embodiment.

The approach according to various embodiments is illustrated in FIG. 8.

Figure 9:
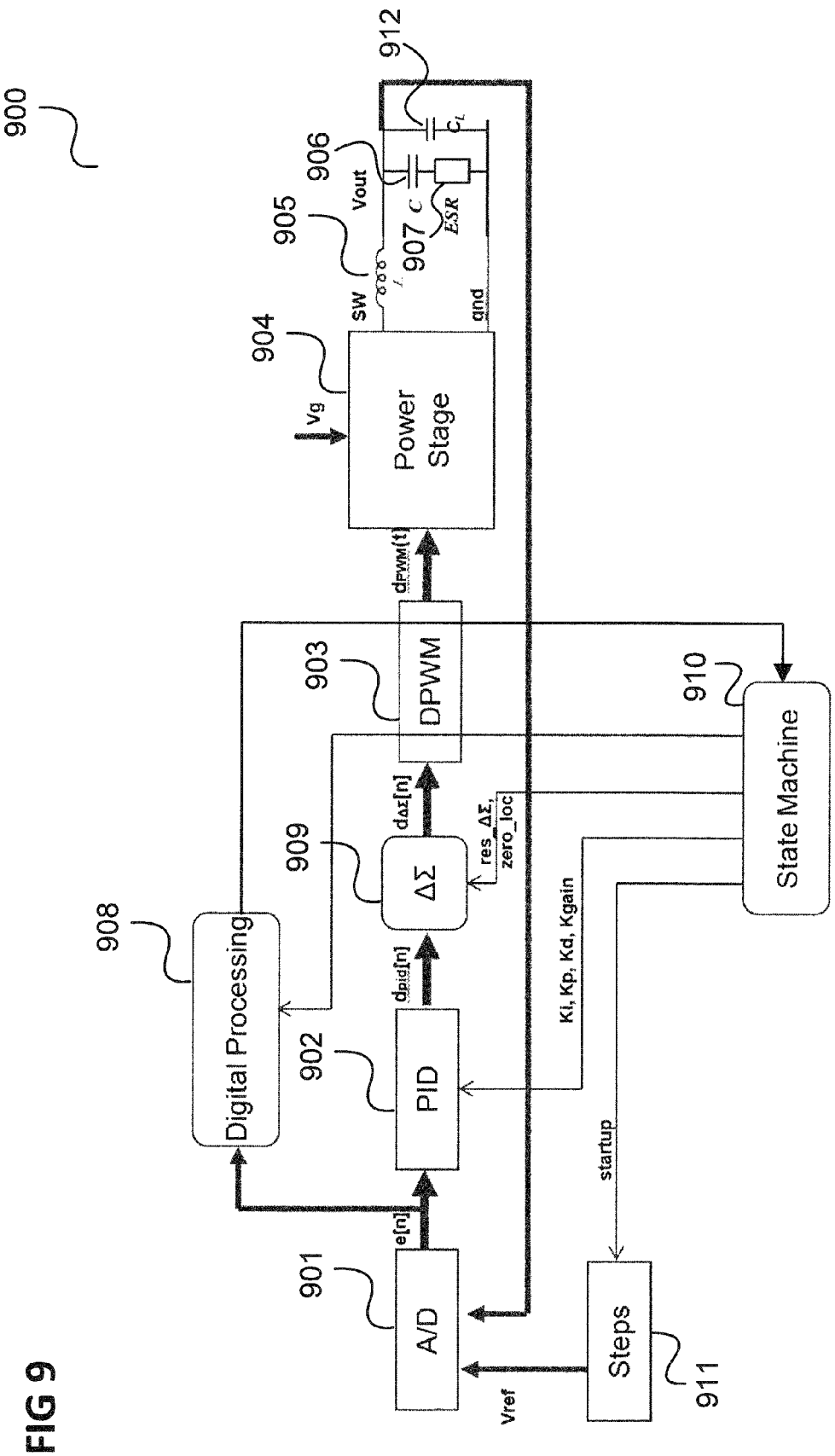
FIG. 9 is a block diagram that depicts an example of an SPMS comprising a state machine according to an embodiment.

FIG. 8 shows a state diagram 800 of a system, e.g. for an SPMS or a controlling stage machine for an SPMS (such as the state machine 910 illustrated in FIG. 9).

In the state diagram 800, an IDLE state (or condition) 801 represents the state where the system parameters (PID default parameters, NTF order and ΔΣ quantizer resolution) and identification algorithm options (in-loop ΔΣ or out-loop ΔΣ, start up identification process by a steps evolving of the voltage reference) are settled.

In case the identification process is based on having an in-loop ΔΣ as source of noise (as in the second arrangement 602) the signal res_ΔΣ (which indicates the resolution of the DPWM) assumes a value equal to the DPWM resolution minus one.

When the system is turned on, it transitions from IDLE state 801 to START-UP state 802. This state is the first where it considers algorithm options: if it decides to apply the identification process already during the start-up of the system (as described above by considering step-response coming from step evolving voltage reference) the system moves on to a WAIT-STEP 803. Otherwise, the system may transition to a WAIT-SS (Steady State) state if it decides that the identification process is implemented to be performed only during the steady-state.

Considering an identification process which combines steady-state and start-up analysis, the actual state of the system is the WAIT-STEP state 803. When the voltage reference step starts the next state is an ADC-REC-SU (SU means Start Up) 805. Here, the ADC converter output (error signal) is recorded. At the end of the step recorded data can be processed. This operation is represented by a DATA-PRO state 806. In this state, while the system is in run with the default configuration, all the required data processing algorithms are applied by the system. When the processing algorithm ends the first load parameters extraction is available, which is done in a PARAM-ID state 807. Mainly in this state the system determines the absolute and relative maximums of the just processed data record. In this state, coming from a start-up process identification, the value of the resonant frequency may be trusted and used as a basis. The ESR value could be extracted but not considered during the first setting of the control parameters (PID).

After the parameters extraction the system moves into a PID-COMP 808 state. In this state the PID parameters (Ki, Kp, Kd and Kgain) are settled in agreement both with just extracted load parameters and the closed-loop constraints which should be reached after a well-done regulation process.

If it is decided to implement the identification process to be performed only during the steady-state condition of the system, after the START-UP state 802 the system may move to WAIT-SS 804 state, in which the system waits until the end of the start-up. When the start-up is considered ended the ADC output contains the error during steady state. After the WAIT-SS state 804 the system moves into an ADC-REC-SS state 809 where the error is recorded. In this state different downsampled data records of the same length may be recorded in order to evaluate multi-averaging results. When the data recording ends, the same routine as just described is performed: processing (DATA-PRO state 806), load parameters extraction (PARAM-ID state 807) and PID regulation (PID-COMP state 808).

The above describes the first identification loop considering either start-up identification or steady state identification.

In summary, this first identification loop in case of start-up identification is composed by the following states:

IDLE→START-UP→WAIT-STEP→ADC-REC-SU→DATA-PRO→PARAM-ID→PID-COMP.

The first identification loop in case of steady state identification (then in case of absence of start-up identification process) is composed by these states:

IDLE→START-UP→WAIT-SS→ADC-REC-SS→DATA-PRO→PARAM-ID→PID-COMP.

Each time new data are recorded, they are processed by the usual sequence of states (DATA-PRO→PARAM-ID→PID-COMP). During steady state a loop of state may be introduced which could be called monitor-loop to evaluate any load degradation and compute the compensated PID coefficients. This sequence could be repeated as load parameters identification is needed. When no monitor-loop is needed the state moves from PID-COMP to a NORM-RUN state 810 (in which normal operation is performed) because no more data need to be recorded.

The last possible transition from PID-COMP state 808 is direct to NTF state 811. Considering to have the in-loop $\Delta\Sigma$ configuration (it means that all of the identification process has been done using the in-loop $\Delta\Sigma$ configuration or that the configuration switches from out-loop to in-loop $\Delta\Sigma$ when this part of algorithms needs to be done), it is possible to work on the structure of the $\Delta\Sigma$ NTF in order to possibly extrapolate or emphasize the ESR effect. In the case that the ESR zeros have been identified during previous identification runs (done without having any modification in the NTF structure decided in the IDLE state 801 where system parameters are fixed) or it should be ensured that no further in-band zeros are added the algorithm provides the possibility to modify the NTF structure. Modifying the NTF structure means to change the order adding zeros in the noise shaping function. Since the ESR zero extraction is done by the extraction of a relative maximum, the absolute maximum contribute given by the resonant frequency may be suppressed or reduced. It is possible to add in the NTF one or more zeros located very close to the LC resonant frequency. In this way the injected noise may be canalized on the frequencies range higher than the LC resonant frequency. Since in this algorithm the zero location in the NTF noise shaping function is related to the resonant frequency the algorithm needs in this case a previous step for the identification of the LC. This is why the transition PID-COMP→NTF→ADC-REC-SS is done after a steady state identification process which allows both to extract the resonant frequency and to individuate the ESR zero contribute.

Thus, all times that the system is in the PID-COMP state 808 during the steady state it is possible to change the NTF structure adding in-band zeros (setting the signal zero_loc in FIG. 9) in order to excite frequencies after the one of resonance.

FIG. 9 shows an SPMS 900.

Similarly to the SPMS 400, the SPMS 900 includes an A/D converter 901, a PID block 902, a DPWM block 903, a power stage 904, an output network (output filter) including an inductor 905, a capacitor 906 and an ESR 907 and a digital processing block 908. The SPMS 900 includes an in-loop $\Delta\Sigma$ block as in the second arrangement 602. The states described with reference to FIG. 8 may be triggered by a state machine 910 which may receive the results from the digital processing block 908. The voltage reference is in this example given by a voltage reference source 911 which may increase the voltage reference in steps. In addition, a load transistor 912 is assumed in this example connected between the voltage output node and the ground node.

In this example, the digital loop is dimensioned by the following parameters:

C load filter cap and its ESR, for example the main filter cap, and in parallel a small load capacitor CL=C/1000.

L=filter inductor, the $\omega_0=1/(LC)$ is at least 2 order lower than $2\pi*Fsw$.

Vg input voltage of the Power Stage, the power stage is composed by driver and switchers.

Vref=desired Vout, i.e. 3.3 V, it is the input of the A/D.

Fck=fast digital clock and DPWM base counter

DPWM is the digital PWM, it has a resolution DPWM_res=i.e. 6 bit (counter from 1 to $2^6$=64, it determines the Fsw)

$\Delta\Sigma$ as described with reference to FIG. 5. The resolution can be equal to DPWM or can be lowered by 1 (DPWM_res−1) during the identification process. The $\Delta\Sigma$ resolution is tuned by the signal res_$\Delta\Sigma$. Here, it is equal to DPWM_res−1 during identification and equal to DPWM_res during full resolution runs. The $\Delta\Sigma$ input zero_loc, possibly needed during ESR identification contains the desired zero position for the NTF. The signal zero_loc is as a vector with a 4 zeroes value for the $\Delta\Sigma$ zeroes.

PID is the digital filter with parameters Kp, Kd, Ki, Kgain.

Considering these parameters, in this example the resonant frequency is $\omega_0=2\pi*5$ KHz and ESR zero $\omega_{ESR}=2\pi*14$ KHz. In the following, results considering some signal processing procedures used in order to obtain a reliable identification process are described. The description is focused mainly on the identification process without considering the results after regulation. All results are based on the same configuration values (including the PID coefficients).

Considering the start-up identification process, referring to the states described with reference to FIG. 8, the state machine 910 runs through the state sequence:

IDLE→START-UP→WAIT-STEP→ADC-REC-SU→DATA-PRO→PARAM-ID→PID-COMP (results of the parameter identification may for example presented, e.g. to a user, at the step PARAM-ID)

Since the identification process during steady state is done by adding noise also time domain results are shown in order to show our system is not so much perturbed.

During START-UP state 802 the system evolves considering as input a step voltage reference as illustrated in FIG. 7. During the reference voltage evolution the algorithm (i.e. the state machine 910) is waiting for the voltage step (in WAIT-STEP state 803) in order to start to record the ADC output (ADC-REC-SU state 805). The WAIT-STEP 803 may be important because there may be multiple steps and it could be decided to record the output only in one of them. Moreover, in order to record all the response of the system a longer step may be chosen and consequently the other steps could be shorter.

In the WAIT-STEP 803 the state machine 910 decides to wait the third step in order to activate the ADC output recording. In this example the state machine 910 decides to stop to record when the fourth step arrives. The algorithm then goes to data processing (DATA-PRO state 806).

Figure 10:
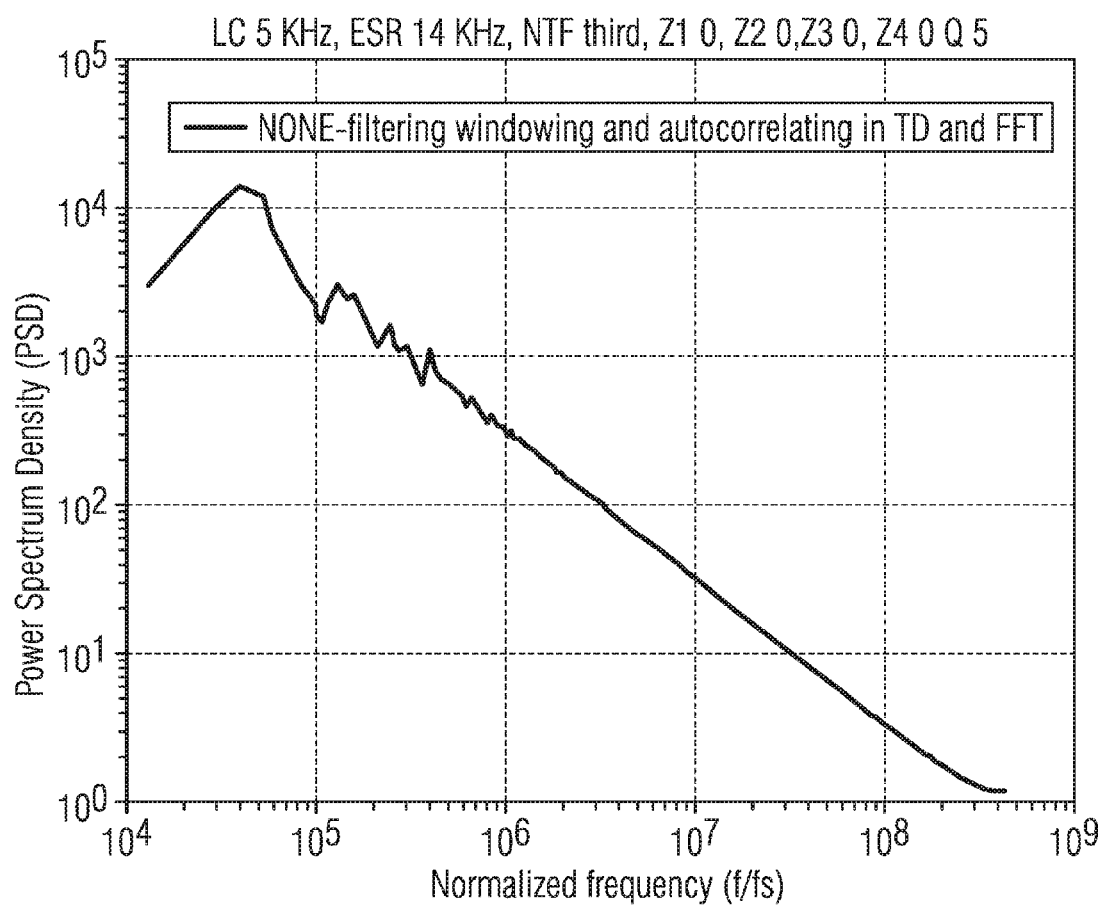
FIG. 10 shows results for an embodiment in an exemplary operation scenario.

FIG. 10 shows PSD results considering $\omega_{ESR}=0$ (no in-band zeros).

As shown in the example in FIG. 10, the resonant frequency may be extracted from the start-up session. Considering a Vref step evolution, and for instance extracting the maximum of the PSD (or the FFT), the LC contributes of the output filter may be determined.

For ESR extraction the presence of the second peak may not be easy to obtain in this approach.

After processing results have been computed, the state machine 910 moves the system to parameters extraction state (PARAM-ID state 1107) where it searches and extracts absolute and/or relative maximums in order to define the rights PID parameters needed for the correction (the correction is not shown here).

The steady-state identification process includes the state machine 910 running through the following sequence of states as described with reference to FIG. 8:

IDLE→START-UP→WAIT-SS→ADC-REC-SS→DATA-PRO→PARAM-ID→PID-COMP (results may be presented at the step PARAM-ID)

After the start-up the steady-state condition (WAIT-SS state 804) is reached. Then the system starts to record the ADC output (ADC-REC-SS state 809).

As mentioned above the case is evaluated where the noise is injected lowering the resolution of the in-loop $\Delta\Sigma$ using the signal res_$\Delta\Sigma$.

Figure 11A:
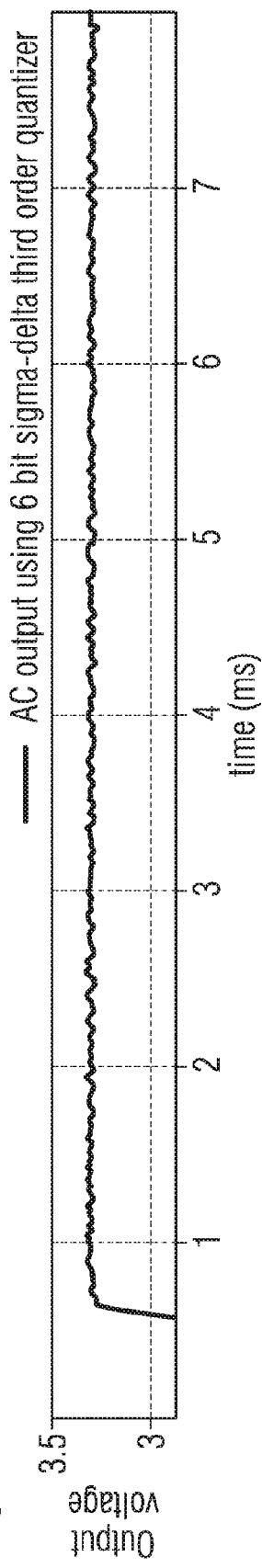
FIG. 11A illustrates the steady state condition considering $\Delta\Sigma$ and DPWM both with the same resolution.

FIG. 11A illustrates the steady state condition considering $\Delta\Sigma$ and DPWM both with the same resolution.

Figure 11B:
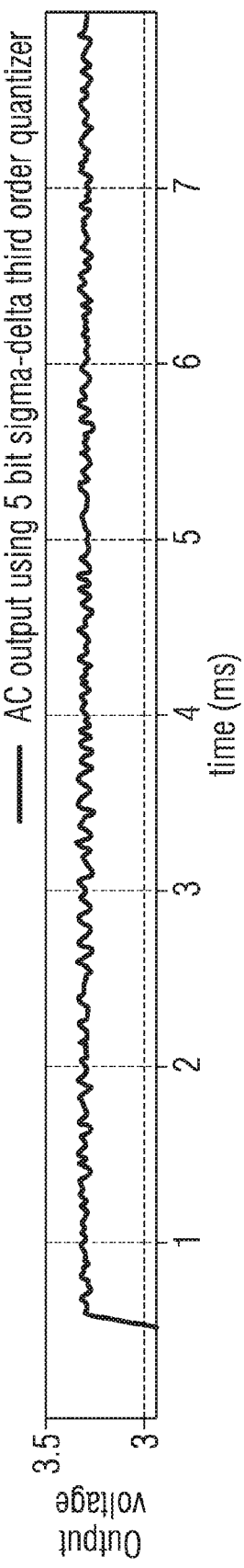
FIG. 11B illustrates the case when the source of noise is an in-loop $\Delta\Sigma$ modulator.

FIG. 11B illustrates the case when the source of noise is an in-loop $\Delta\Sigma$ modulator (referring to the SPMS 900 FIG. 9 with $\Delta\Sigma\_res=DPWM\_res-1$).

FIG. 11A and FIG. 11B show the respective output voltage of the SPMS over time.

In FIG. 11B the case of a noise injected by a 5 bit $\Delta\Sigma$ quantizer is considered. In FIG. 11A, DPWM and $\Delta\Sigma$ have both 6 bit quantizer resolutions. In both FIG. 11A and FIG. 11B it is visible as, injecting noise, a large range of load frequencies are excited, these frequencies are filtered out an LC filter which compose a Buck converter. By analyzing the digitized error coming out from the ADC converter load parameters may be extracted.

After recording the ADC output during the steady-state (in this case only one time record is recorded, but multiple records may be recorded in order to implement multi-averaging processing). The state machine 910 computes the processing results in DATA-PRO state 806. When the processing ends the state machine 910 moves to PARAM-ID state 807 where load parameters are extracted by the usual search of absolute (resonant frequency) and relative (ESR contribute) maximums.

FIG. 12 shows PSD results considering an in-loop $\Delta\Sigma$ source of noise in two curves 1201, 1202. The two curves 1201, 1202 differ from each other because in the top curve 1201 ESR contributes are not considered (there is only the absolute maximum which refers to the resonant frequency, in the bottom curve 1202 the additional relative maximum refers to the ESR).

From the results presented in FIG. 12 it can be seen that that it is possible to evaluate ESR effects considering the relative maximum in the PSDs.

Furthermore, it is possible to excite the ESR effects with respect to resonant frequency effects (maximum absolute) working on the noise injection. In this case the two external inputs of the $\Delta\Sigma$ device have this possible configuration:

−zero_loc=[0.9 0 0 0]. This means that a zero is added at 90% of the resonant frequency. This confirms that the approach may be composed by two steps: it may be needed to know the resonant frequency order to locate NTF zero/s close to it. Before at least a start-up and/or a steady-state identification process may be used. To have an identification step before could be useful also to understand and/or individuate the in-band ESR, and then it is possible to be sure about the ESR location with a second step (where the NTF expression is modified).

−$\Delta\Sigma$_res=5.

FIG. 13 illustrates the result of modifying a third order NTF in order to add an in-band zero close to the resonant frequency (Z1=0.9*f0). A first curve 1301 (ESR contribute) presents a difference between the absolute and relative maximum which is lower than in FIG. 12 where no in-band zeros have been introduced. A second curve 1302 corresponds to the case without ESR contributes.

Knowing the resonant frequency and the ESR position the expected system open loop bandwidth may be determined.

Then the time record may be processed in order to extract the resonant frequency, and in a second step the NTF may be modified adding one or more in-band zeros in order to extract the ESR zero. Two steps may be used in order to locate the in-band zeros in a position related to the resonant frequency. Anyway, it can be seen in the PSD analysis that the ESR could be also extrapolated without any modification of the NTF structure: modifying the NTF results in a process which could be used for confirming and/or individuating minimum ESR contributes. Averaging and/or filtering processing functions combined both with downsampling and windowing could excite these effects in order to have really reliable extracted data.

In the following, conventional approaches for determining parameters of external components, such as an output network, are described.

Figure 14:
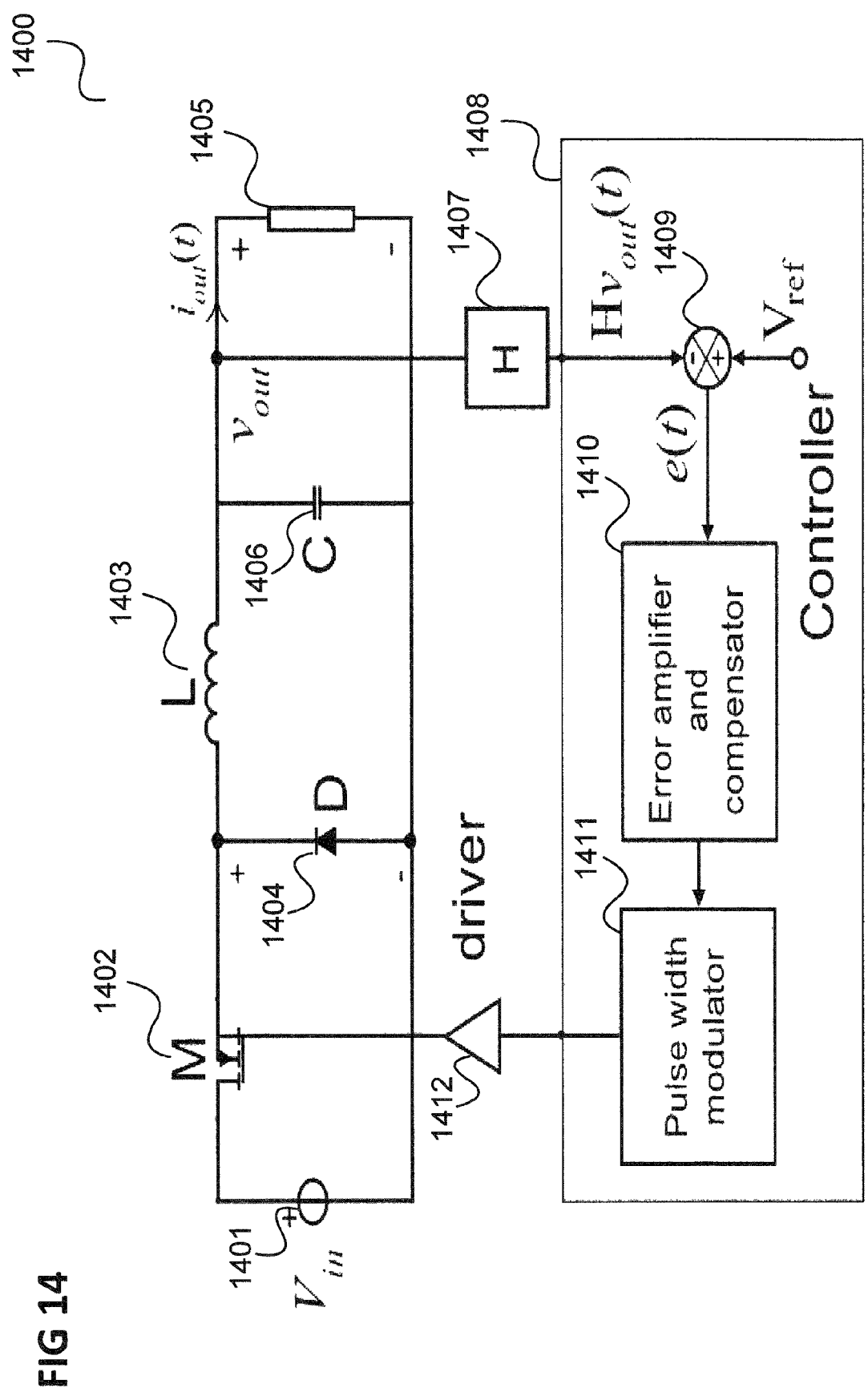
FIG. 14 shows a switched-mode power supply (SPMS) converter in a step down configuration.

FIG. 14 shows an example for a typical SMPS converter 1400 in a step down configuration. The converter 1400 is a voltage regulator that regulates an output voltage Vout.

The SMPS converter 1400 includes an input voltage source 1401 whose positive output is coupled via a field effect transistor 1402 to an inductor 1403. The field effect transistor 1402 comprises a gate. The cathode of a diode 1404 is connected between the field effect transistor 1402 and the inductor 1403. The anode of the diode 1404 is connected to the negative output of the input voltage source 1401 (this is e.g. a ground terminal). The inductor 1403 lies between the cathode of the diode 1404 and the connection node of a load 1405. The other connection node for the load is the anode of the diode 1404. The voltage at the load 1405 is the output voltage Vout. A capacitor 1406 is in parallel to the load 1405. The output voltage Vout is fed to a multiplier 1407 which generates a multiplied output voltage. The multiplied output voltage is fed to a controller 1408 which includes a subtractor 1409 that determines a difference e(t) between the multiplied output voltage and a reference voltage Vref. This difference (error signal) may be fed to an error amplifier and compensator 1410 which controls a pulse width modulator 1411 that controls a driver 1412 that controls the a voltage of the gate of the field effect transistor 1402 and thus the output voltage.

The inductor 1403 and the capacitor 1406 are external components to the SPMS converter 1400. The transistor 1402 is a reference switch. The system regulates Vout based on voltage Vref. The output network (including the inductor 1403 and the capacitor 1406) generates a pair of complex poles. The controller 1408 is configured to maintain system loop stability and high open loop gain in order to increase Vout accuracy.

The controller 1408 generates a low frequency pole and two zeroes in order to reach the desired loop transfer function.

A variation of the inductor 1403, the capacitor 1406 or the equivalent serial resistor (ESR, not shown in FIG. 14) could lead the system to instability. The controller 1408 should be able to take into account this variation. For this, it may be configured in a conservative way, i.e. in a safe manner that makes it robust versus instability. However, when the controller 1408 is configured in this way, the dynamic performances of the system loop (i.e. load step response) may be too low and not compliant with system requirements.

A power stage parameter drift such as a variation of the inductor 1403, the capacitor 1406 or other components can be mitigated by offline controller re-calibration to maintain desired dynamic performance constraints. These techniques are often called Auto-Tuning or Self-Tuning. Typically, it may be desirable to identify an external component (e.g. an inductor and or a capacitor) or the output power filter frequency characteristics (poles and zeroes). Such methods may require intense numerical computations, for this reason they are suitable for digitized systems and for advanced silicon technologies that allow high chip integration such that a low chip area is required to provide the computational resources for the computations (e.g. a costly computation may be required in a small silicon area).

In the following, two typical common approaches are described for an SMPS (switch mode power supply), that is coupled to an external filter (e.g. realized by both an inductor and a capacitor such as the inductor 1403 and the capacitor 1406 illustrated in FIG. 14) external to the SMPS which introduces a couple of complex conjugate poles.

The first approach is based on induced closed loop oscillations caused by inserting both a relay and an integrator inside the control loop. This is illustrated in FIG. 15.

FIG. 15 shows a control loop 1501.

The control loop 1501 includes a subtractor 1505 configured to generate the difference signal between a reference signal yref (e.g. reference voltage) and an output signal y (e.g. output voltage). A relay 1506 generates a control signal u from the difference signal e. The relay (e.g. a latching relay) 1506 is in this example used to provide a hysteresis. The control signal u gives, according to the controlled system 1507, rise to the output voltage y. FIG. 15B shows a signal diagram 1502 of the output signal y of the control loop of FIG. 15A.

The signal diagram 1502 shows the induced oscillations of the output signal y over time.

Figure 15A:
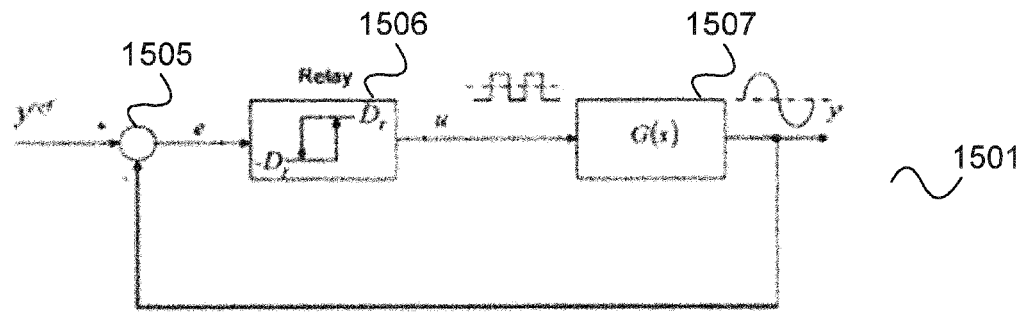
FIG. 15A shows a control loop.
Figure 15B:
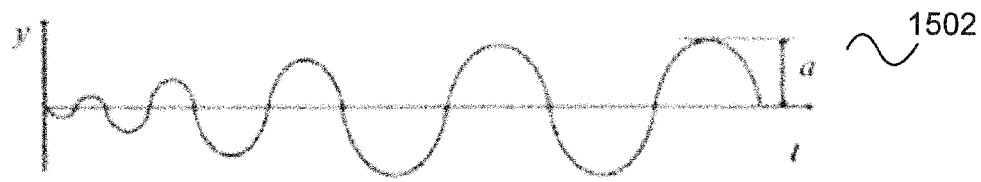
FIG. 15B shows a signal diagram of the output signal of the control loop of FIG. 15A.
Figure 15C:
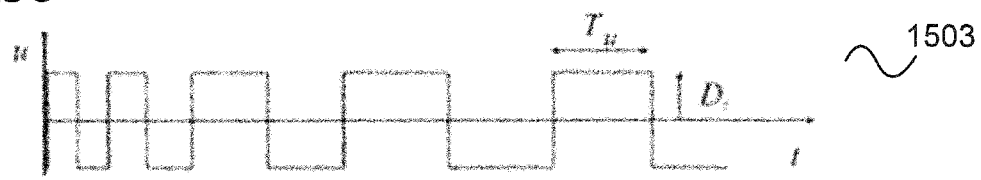
FIG. 15C shows a signal diagram of the actuating variable of the control loop of FIG. 15A.

FIG. 15C shows a signal diagram 1503 of the actuating variable u of the control loop of FIG. 15A.

The second signal diagram 1503 shows the control signal u (actuating variable), i.e. the output of the relay 1506, over time.

A user may use both frequency and/or amplitude of the oscillations to identify system characteristics and in particular the load. A user may for example bring the system into oscillation by a suitable excitation. The relay 1506 introduces a non-linearity.

Figure 15D:
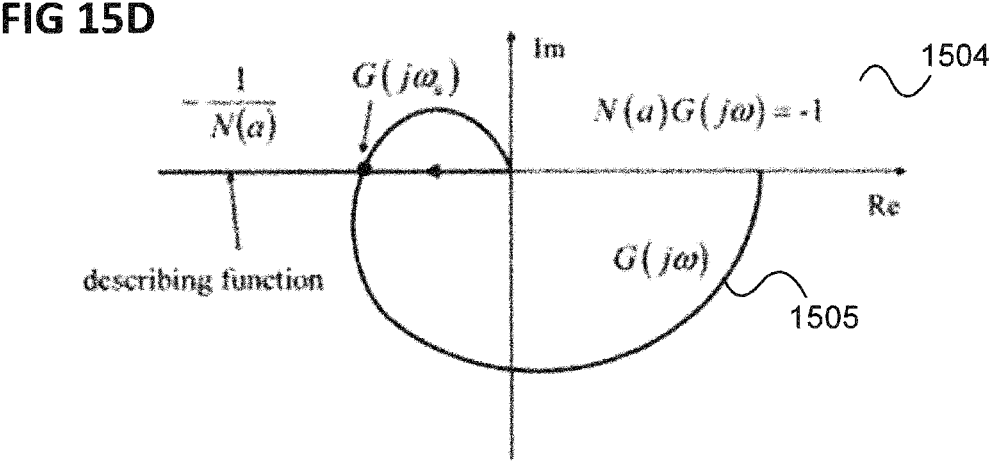
FIG. 15D shows a Nyquist diagram for the control loop of FIG. 15A.

FIG. 15D shows a Nyquist diagram 1504 for the control loop of FIG. 15A.

The Nyquist diagram 1504 shows a graph 1505 of G(jω) (i.e. the function describing the controlled system 1507 in frequency domain) of the control loop of FIG. 15A. The graph 1505 is characterized mainly by a real part with −180° phase (the imaginary part could be considered negligible because it is related with the little delay introduced by the Relay hysteresis). Closing the loop the system oscillates at a frequency given by the crossing of the graph 1505 with the characterizing function of the relay diagram 1506. This means that it oscillates at the frequency where the phase is −180° since in this case the fed back signal amplifies the input signal.

Figure 16:
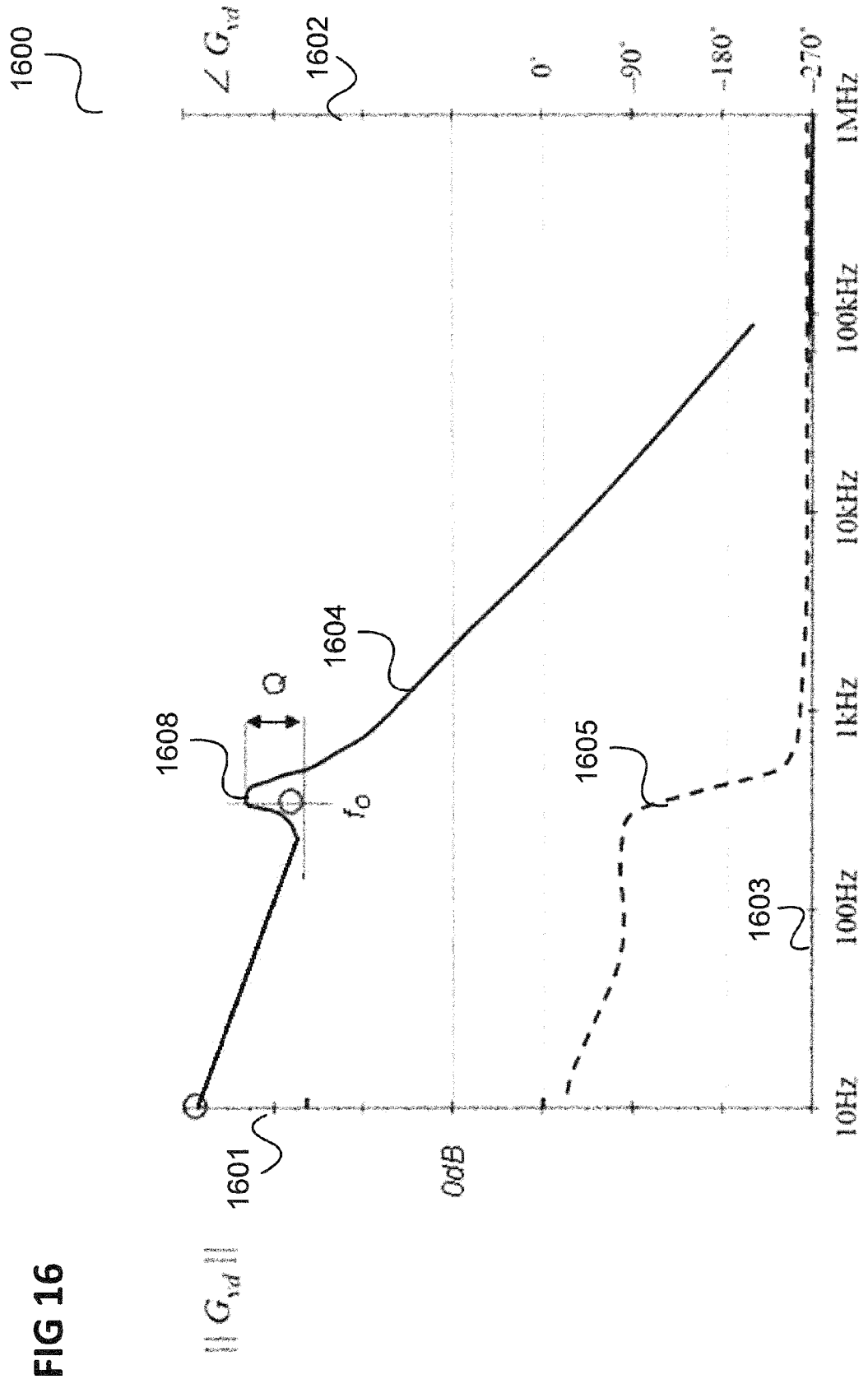
FIG. 16 shows a diagram showing amplitude and phase of a controlled system depending on frequency.

FIG. 16 shows a diagram 1600 showing an amplitude (shown as solid line 1604, according to a first axis 1601) and a phase (shown as dashed line 1605, according to a second axis 1602) of G(jω) depending on frequency (given by a third axis 1603).

In this example, G(jω) is composed by a low frequency pole (integrator) and the complex poles of an output power net (including inductor L and capacitor C, e.g. similar to the inductor 1403 and the capacitor 1406 illustrated in FIG. 14) of the controlled system 1507. The controlled system 1507 oscillates around the frequency $f_O$ of the complex poles as indicated by peak 1608. This frequency can be determined and extracted from relay output processing.

The relay 1506 may be substituted by a component providing a special phenomenon induced in a digital loop, known as limit cycle oscillation (LCO). A pulse width modulator PWM of the controlled system 1507 may in this case be realized by a digital counter. In case the controlled system 1507 includes an ADC converter connected to the PWM, it may occur that the resolution of the duty cycle generated by the PWM is too coarse and the error related to the output voltage (i.e. the output signal y in this example) is not be mapped into the ADC converter (analogue to digital converter) zero-error bin. In this case the output voltage may oscillate between ±1LSB (least significant bit) of the ADC converter. The oscillation frequency of this oscillation is typically correlated with the LC complex pole frequency.

In the above (first) approach non-idealities effects such as ESR contributes are not considered. Large ESRs typically affect the identification process which may lead to erroneous results. Further, during the utilization the bandwidth of the control loop 1501 may be decreased and the dynamics performance of the control loop may be lowered. An oscillation introduced into the control loop 1501 (normally at low frequency) could disturb other sensible equipments.

According to a second approach, a multi-period Pseudo Random Binary Sequence (PRBS) is introduced which can be seen as a digital emulation of white noise. The reaction of a system such as an SPMS with control loop to an ideal white noise is related to the system impulse response. Frequency domain analysis of the impulse response may contain all the frequency information needed to characterize the system. System parameters can be found by signal processing.

However, PRBS is typically not exactly an ideal white noise. A spectrum obtained by a PRBS is highly noisy mainly at medium-high frequencies. Thus results of a parameter extraction of the system may be affected leading to a wrong identification. For example, it may therefore not be possible to evaluate the ESR contribute.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A converter circuit, comprising:
   a switch circuit configured to provide an output voltage to a load;
   a control circuit comprising an analogue control portion and a digital control portion;
   a noise generator configured to generate white noise using a sigma delta converter having more than one feedback loop; and wherein at least one zero of the sigma delta converter is near to the load resonance frequency;
   wherein the noise generator is configured to supply the generated white noise to the digital control portion of the control circuit; and
   wherein the control circuit is configured to control the switch circuit based on the white noise.

2. The converter circuit of claim 1,
   wherein the control circuit is configured to control the switch circuit based on the white noise in order to determine at least one property of at least one of the load and of the converter circuit.

3. The converter circuit of claim 2,
   wherein the control circuit is further configured to determine one or more of a group consisting of:
   an inductance of an inductor;
   a capacitance of a capacitor;
   an equivalent serial resistance of a capacitor; and
   an electric property of the load.

4. The converter circuit of claim 1,
   wherein the control circuit is configured to control the switch circuit to provide the output voltage based on a duty cycle; and
   wherein the control circuit is configured to control the switch circuit based on the white noise by adding the generated white noise to the duty cycle.

5. The converter circuit of claim 1, wherein the control circuit comprises:
   an analog to digital converter configured to receive an indication of the output voltage and to provide a digital value indicative of the received indication of the output voltage.

6. The converter circuit of claim 5,
   wherein the analog to digital converter is further configured to
   compare the received indication of the output voltage to a reference voltage; and
   generate an error signal that represents a difference between the received indication of the output voltage and the reference voltage.

7. The converter circuit of claim 6,
   wherein the control circuit is configured to add the generated white noise to the error signal.

8. The converter circuit of claim 6,
   wherein the control circuit is configured to sequentially increase the reference voltage.

9. The converter circuit of claim 6,
   the control circuit further comprising a proportional-integral derivative (PID) controller configured to receive the error signal and generate a PID output based on the received error signal.

10. The converter circuit of claim 9,
    wherein the control circuit is further configured to add the generated white noise to the PID output.

11. The converter circuit of claim 9,
    the control circuit further comprising a pulse width modulation controller configured to receive the PID output and to generate a pulse width modulated control signal configured to control a power stage to provide the output voltage to the load.

12. The converter circuit of claim 1,
    wherein the noise generator is further configured to decrease a resolution of the sigma delta converter to increase an amplitude of the generated white noise.

13. The converter circuit of claim 1,
    wherein the control circuit further comprises:
    an analog to digital converter (A/D) configured to
    receive an indication of an output voltage at the load;
    compare the received indication of the output voltage to a reference voltage; and
    generate an error signal that represents a difference between the received indication of the output voltage and the reference voltage; and
    wherein the control circuit is configured to:
    process the error signal to determine one or more of the cut-off frequencies of the control circuit and an equivalent series resistance of a capacitor.

14. The converter circuit of claim 13,
    wherein the control circuit is further configured to process the error signal to determine a Spectral Power Density.

15. The converter circuit of claim 14,
    wherein the control circuit is further configured to determine one or more of a loop cut frequency of the control circuit and an equivalent series resistance of a capacitor based on the determined Spectral Power Density.

16. The converter circuit of claim 13,
    wherein the control circuit is further configured to adapt at least one coefficient of a proportional-integral derivative (PID) controller configured to receive the error signal and generate a PID output based one or more of the determined loop cut frequency of the control circuit and the determined equivalent series resistance of a capacitor.

17. A method for converting an input voltage to an output voltage, the method comprising:
    generating white noise using a sigma delta converter having more than one feedback loop; and wherein at least one zero of the sigma delta converter is near to the load resonance frequency;
    supplying the generated white noise to a digital control portion of a control circuit; and
    controlling a switch circuit based on the white noise to provide the output voltage.

18. The method of claim 17,
    wherein the switch circuit is controlled based on the white noise in order to determine at least one property of at least one of the load and of the converter circuit.

19. The method of claim 18,
    wherein the at least one property of at least one of the load and of the converter circuit comprises one or more of a group consisting of:
    an inductance of an inductor;
    a capacitance of a capacitor;
    an equivalent serial resistance of a capacitor; and
    an electric property of the load.

20. The method of claim 17,
    wherein the switch circuit is controlled to provide the output voltage based on a duty cycle; and
    wherein the switch circuit is controlled based on the white noise by adding the generated white noise to the duty cycle.

21. The method of claim 17, further comprising:
analog to digital converting a received indication of the output voltage to provide a digital value indicative of the received indication of the output voltage.

22. The method of claim 21,
wherein the analog to digital converting comprises:
   comparing the received indication of the output voltage to a reference voltage; and
   generating an error signal that represents a difference between the received indication of the output voltage and the reference voltage.

23. The method of claim 22,
wherein the generated white noise is added to the error signal.

24. The method of claim 22, further comprising:
sequentially increasing the reference voltage.

25. The method of claim 22, further comprising:
receiving the error signal; and
generating a proportional-integral derivative (PID) output based on the received error signal by means of a proportional-integral derivative controller of the control circuit.

26. The method of claim 25,
wherein the generated white noise is added to the PID output.

27. The method of claim 25,
receiving the PID output by a pulse width modulation controller of the control circuit; and
generating a pulse width modulated control signal by the pulse width modulation controller to control a power stage to provide the output voltage to the load.

28. The method of claim 17, further comprising:
decreasing a resolution of the sigma delta converter to increase an amplitude of the generated white noise.

* * * * *